United States Patent
Madenokouji et al.

[19]

[11] Patent Number: 6,082,122
[45] Date of Patent: Jul. 4, 2000

[54] METHOD FOR CALIBRATING A MEASURED VALUE OF DETECTING MEANS

[75] Inventors: Masaki Madenokouji, Saitama-ken; Keigo Onizuka, Gunma-ken; Isao Morita, Gunma-ken; Hisashi Tokizaki, Gunma-ken, all of Japan

[73] Assignee: Sanyo Electric Co., Ltd., Ohsaka-fu, Japan

[21] Appl. No.: 09/172,904

[22] Filed: Oct. 15, 1998

[30] Foreign Application Priority Data

Mar. 31, 1998 [JP] Japan ................................. 10-086104

[51] Int. Cl.⁷ ..................................................... G05F 1/67
[52] U.S. Cl. .................. 62/77; 62/127; 62/236; 62/298; 324/74
[58] Field of Search ............................ 62/125, 126, 127, 62/129, 236, 235.1, 230, 298, 77; 374/1, 2, 3; 324/74, 130; 236/94, 51; 702/99, 104, 106

[56] References Cited

U.S. PATENT DOCUMENTS

| | | | |
|---|---|---|---|
| 4,362,270 | 12/1982 | Cleary et al. | 236/51 X |
| 4,682,648 | 7/1987 | Fried | 236/51 X |
| 5,321,638 | 6/1994 | Witney | 702/104 |
| 5,325,048 | 6/1994 | Longini | 324/74 |
| 5,375,429 | 12/1994 | Tokizaki et al. | 62/236 X |
| 5,453,697 | 9/1995 | Schweer et al. | 702/104 X |
| 5,501,083 | 3/1996 | Kim | 62/236 X |
| 5,560,218 | 10/1996 | Jang | 62/236 X |
| 5,878,584 | 3/1999 | Sasaki et al. | 62/236 X |

FOREIGN PATENT DOCUMENTS

| | | |
|---|---|---|
| 0 182 394 | 5/1986 | European Pat. Off. . |
| 0 827 254 | 3/1998 | European Pat. Off. . |
| 2 537 272 | 6/1984 | France . |
| 31 28 095 | 2/1983 | Germany . |
| 92 11 664 | 1/1993 | Germany . |

*Primary Examiner*—Harry B. Tanner
*Attorney, Agent, or Firm*—Knobbe, Matens, Olson & Bear, LLP

[57] ABSTRACT

There is provided a calibration method of a detecting section which is provided on a substrate incorporated into a system interconnection generator and which detects by detecting means an object to be detected or an value of the object to be detected. The calibration method comprises the steps of prior to the substrate being incorporated into the system interconnection generator, measuring by the detecting section a reference value of the object to be detected by the detecting section; storing at least one of an error with respect to the reference value measured by the measuring step and the measured value of the reference value in association with the measurement result; and after the substrate being incorporated into the system interconnection generator, outputting the measurement result of the detecting section based on at least one of the error and the measured reference value, stored by the storing step in association with the measurement result.

9 Claims, 14 Drawing Sheets

FIG. 8

| SETTING ITEMS | SETTING ALLOWABLE RANGE |
|---|---|
| SYSTEM OVERVOLTAGE | 110 ~ 124 V |
| SYSTEM UNDERVOLTAGE | 110 ~ 120 V |
| SYSTEM OVERFREQUENCY | 50.5 ~ 51.9 Hz |
| SYSTEM UNDERFREQUENCY | 48.1 ~ 49.5 Hz |

METHOD FOR CALIBRATING A MEASURED VALUE OF DETECTING MEANS

BACKGROUND OF THE INVENTION

1. Field of the Invention

The present invention relates to a detecting system, a system interconnection generator which allows electric power generated by using sunlight, fuel cell or the like as an energy source to be superimposed on a line of a commercial electric power source, to an air conditioner which operates in cooperation with the system interconnection generator, and also to a method for calibrating physical quantities such as a voltage value and a current value, which are detected by detecting means.

2. Description of the Related Art

A separate-type air conditioner comprised of an indoor unit and an outdoor unit has the structure in which an apparatus which forms a refrigerating cycle is installed in the indoor unit and the outdoor unit in such a manner as to be properly divided into the two units, and due to evaporative and condensing action of a refrigerant circulated in a refrigerating cycle, the air conditioner is provided to achieve air conditioning for an interior of a room to be air-conditioned.

In this air conditioner, a microcomputer is provided for each of the indoor unit and the outdoor unit to effect control of operation of each of the units. Each microcomputer allows data-exchangeable interconnection by serial communication circuits and signal lines. The microcomputer provided in the indoor unit effects overall control of the air conditioner.

In recent years, a solar generator utilizing solar energy has widely spread. The solar generator converts electric power generated by sunlight to the same mode as a commercial electric power source, and thereafter, allows the converted electric power to be superimposed on a line of the commercial electric power source.

Some air conditioners allow information exchange with such solar generator, and also utilize, as one of operation information, information based on electric power (i.e., an value of power generated by a solar cell) outputted from a system interconnection generator.

On the other hand, in a case in which abnormality such as power supply interruption occurs in the commercial power source when electric power generated by a system interconnection generator is supplied as the commercial power source, it is necessary to stop supply (generation) of electric power so as to prevent a harmful influence caused by an individual operation of the system interconnection generator. For this reason, the microcomputer for controlling power generation of the system interconnection generator includes a protective function which operates based on a constant set by a dip switch, a rotary switch, or the like.

This protective function requires various parameters so as to monitor the state of a line of a commercial power source. An operator sets, by effecting input setting using a dip switch or effecting input using a rotary switch, a variable resistance, and an A/D conversion input device, a parameter based on a location where the system interconnection generator is installed or the kind of a system to be interconnected. The set parameter is converted to a corresponding signal and is stored in the microcomputer. As a result, when the state of the line of the commercial power source exceeds any parameter, the protective function becomes effective (active) to parallel off the system interconnection generator from the line of the commercial power source.

However, in order to properly monitor generated electric power and the state of the line of the commercial power source, it is necessary that items of the parameter be increased and be set finely. In order that items of the parameter be increased and be set finely, the number of ports of the microcomputer needs be increased to correspond to the number of items. Further, a setting operation becomes complicated and input of a concrete numerical value is impossible in a dip switch or the like. For this reason, it is difficult to set a proper parameter.

Moreover, the parameter varies depending on, for example, a location where the system interconnection generator is installed, and therefore, it is necessary to set a proper parameter in accordance with the location of installation, or the like. Accordingly, an operator needs to move to the location where the system interconnection generator is installed so as to alter a stored parameter.

A solar generator used as the system interconnection generator generates electric power by a solar cell. The output voltage-output current characteristic of the solar cell is generally represented by a curve as shown in FIG. 14A. Accordingly, the output voltage-output power characteristic of the solar cell is represented by a curve as shown in FIG. 14B. Namely, in the solar cell, when the output voltage is set in a range of 0[V] to a predetermined value, output power gradually increases. When the output voltage exceeds the predetermined value, output power gradually decreases. The output power at the predetermined voltage becomes the maximum power of the solar cell and the point of the maximum power is a maximum power point $P_m$.

As control for taking out the maximum power from the solar cell having the above-described characteristic, there is known Maximum Power Point Tracking (MPPT) control which changes output power so that an operating point of the solar cell constantly tracks the maximum power point $P_m$.

The MPPT control allows the operating point of the solar cell to approach to the maximum power point (i.e., optimum operating point) by the procedure in which a voltage command value which becomes a target value controlled by an operating voltage of the solar cell is changed slightly a fixed time interval and an output power of the solar cell at this time is measured and compared with a previously measured value, and the above-described voltage command value is changed in a direction in which output power constantly increases.

Conventionally, control of solar power generation using such MPPT control or the like is effected based on results of detection of output voltage, output current, and the like, of the solar cell in a detecting section.

However, in the above-described conventional technique, the results of detection in the detecting section is used for control of solar power generation in a state of being left unchanged, and therefore, there is a drawback in that high-accurate control cannot be effected due to an error of measurement of an object to be detected, which is mainly caused by differences of individual characteristics in the detecting section.

Concretely, when solar power generation is effected by, for example, MPPT control, the output current and output voltage of the solar cell are detected by the detecting section, and based on the results of detection, output power of the solar cell is calculated, and further, control is made so that the output power becomes maximum. However, at this time, when an error occurs in the results of detection of the output voltage and output current, high-accurate MPPT control for obtaining a proper output power becomes difficult. Meanwhile, the same may be said of, in addition to the detecting section which detects the output current and output voltage of the solar cell, a detecting section which detects output current of an inverter circuit generally used in a solar generator, the temperature of a radiating heat sink of the inverter circuit, and the like.

SUMMARY OF THE INVENTION

In view of the above-described circumstances, an object of the present invention is to provide a method for calibrating a detecting section, and a system interconnection generator, which can each effect system interconnection power generation such as power generation using sunlight at high accuracy.

According to a calibration method of a detecting section of the present invention, prior to a substrate having a detecting section to which detecting means for detecting an object to be detected or an value of an object to be detected is connected being incorporated into a solar generator, in a measuring process, a reference value of the objected to be detected in the detecting section is measured by the detecting section. In this case, for example, when a solar generator is used as a system interconnection generator, the object to be detected may be output voltage and output current of a solar cell, a step-up circuit, and an inverter circuit, a temperature of a heat sink which prevents increase of the temperature of an inverter circuit to a high temperature, and the like.

In a storing process, at least one of an error of a measurement result obtained by the measuring process and the reference value, and the measured value of the reference value is stored in association with the measurement result.

When the substrate is incorporated into the solar generator, in an output process, an actual measurement result of the detecting section is outputted based on at least one of the error and the measured value of the reference value, which are stored by the storing process in association with the measurement result. Namely, in the output process, based on a previously measured error, an error corresponding to an actual measurement result of the detecting section is eliminated, but the reference value stored to correspond to the actual measurement result of the detecting section is outputted, as a measurement result, in a state of being left unchanged. As a result, high-accurate correction which reflects separate characteristics of the detecting section can be achieved for the measurement result of the detecting section, and even when the solar generator is used as the system interconnection generator, power generation using sunlight can be effected at high accuracy.

Further, in the present invention, a plurality of reference values of objects to be detected in the detecting section are measured by the detecting section and stored. In the output process, a detection result of the detecting section is obtained by interpolation based on at least one of a plurality of errors and reference values stored in association with the measurement result. As a result, high-accurate correction for the measurement result of the detecting section in the measuring process becomes possible and power generation using sunlight can be effected at high accuracy.

Further, in the apparatus (system interconnection generator) of the present invention, storing means is provided on a substrate having a detecting section to which detecting means for detecting an object to be detected or an value of the object to be detected is connected. For example, prior to the substrate being incorporated into the solar generator, the storing means stores at least one an error of a measurement result when a reference value of an object to be detected in the detecting section is measured by the detecting section and the reference value, and the measured value of the reference value in association with the measurement result.

On the substrate incorporated into the solar generator, when the measurement result of the detecting section is outputted by output means, an error corresponding to an actual measurement result of the detecting section is eliminated from the measurement result, or a reference value corresponding to an actual measurement result of the detecting section is outputted in a state of being left unchanged. At this time, the measurement result of the detecting section may be interpolated based on the reference value or error stored in the storing means. As a result, high-accurate correction which reflects separate characteristics of the detecting section can be achieved for the measurement result of the detecting section, and power generation using sunlight can be effected at high accuracy.

In the system interconnection generator of the present invention as described above, a nonvolatile memory which allows rewriting of information, for example, Electrically Erasable Programmable Read-Only Memory (EEPROM: readable and writable external storage IC) is used as the storing means. As a result, the measurement result can be stored while measuring the reference value.

Further, in the present invention, a parameter is stored in the storing means with the nonvolatile memory used. The parameter can be written or rewritten by parameter writing means. As a result, an accurate numerical value can be set and stored as the parameter.

According to an air conditioner with a system interconnection generator of the present invention, a display portion is provided in an indoor unit of an air conditioning portion, which is provided in the interior of a room, and displays an operating state of the system interconnection generator. As a result, the operating state of the system interconnection generator such as a solar generator, which is provided outdoors, can be confirmed in a state in which an operator remains in the interior of a room.

Further, in the air conditioner with a system interconnection generator of the present invention, in the interior of a room where the indoor unit of the air conditioning portion is provided, writing and rewriting of a parameter stored in the storing means such as a nonvolatile memory are allowed by the operating means.

As a result, the parameter for monitoring electric power generated by the system interconnection generating portion and electric power of a commercial power source can be set by writing a concrete numerical value. Further, there is no possibility that the set parameter be deleted accompanied with the operating state of the system interconnection generating portion, and the parameter can also be easily stored finely and for each of a large number of items.

Further, the parameter (default value) stored at the time of forwarding the apparatus from the factory can be easily corrected in accordance with the location where the system interconnection generator is installed or the state in which the system interconnection generator is installed. As a result, it is not necessary to mount a member such as a dip switch or provide an exclusively used port, and various parameters can be set by using a conventional apparatus as it is. Accordingly, a proper parameter can be easily set without increasing the number of parts.

Further, the operating means and the display portion are provided in an integrated manner, and therefore, a proper value is inputted while a parameter is being displayed on the display portion, and respective ranges of generated power and power of a commercial power source are determined again, and based on the newly set parameter, monitoring for the generated power and the power of a commercial power source becomes possible.

Moreover, the parameter can be inputted and set from the interior of a room in which the indoor unit is provided while the parameter is being confirmed by the display provided in the display portion. For this reason, the parameter can be easily set at the position in the vicinity of the indoor unit without an operator moving to the position near the system interconnection generator.

In the present invention, a remote controller in which the operating means and the display portion are formed integrally with each other can be used. The remote controller may be connected to the indoor unit in a wired manner or connected to the indoor unit by using communication means in a wireless manner.

Such remote controller may be a remote controller exclusively used for setting of a parameter, but may be combined with a remote controller for confirming operating states of the system interconnection generating portion and the air conditioning portion or may be combined with a remote controller for operating the air conditioning portion. As a result, a function for setting a parameter is added to a remote controller for operating a conventional air conditioning portion and the parameter can be set easily without increasing the number of devices.

BRIEF DESCRIPTION OF THE DRAWINGS

FIG. 8 is a list which shows examples of an item and a range of a parameter, which can be set by a remote control.

DESCRIPTION OF THE PREFERRED EMBODIMENTS

Referring now to the attached drawings, an embodiment of the present invention will be described hereinafter.

Figure 1:
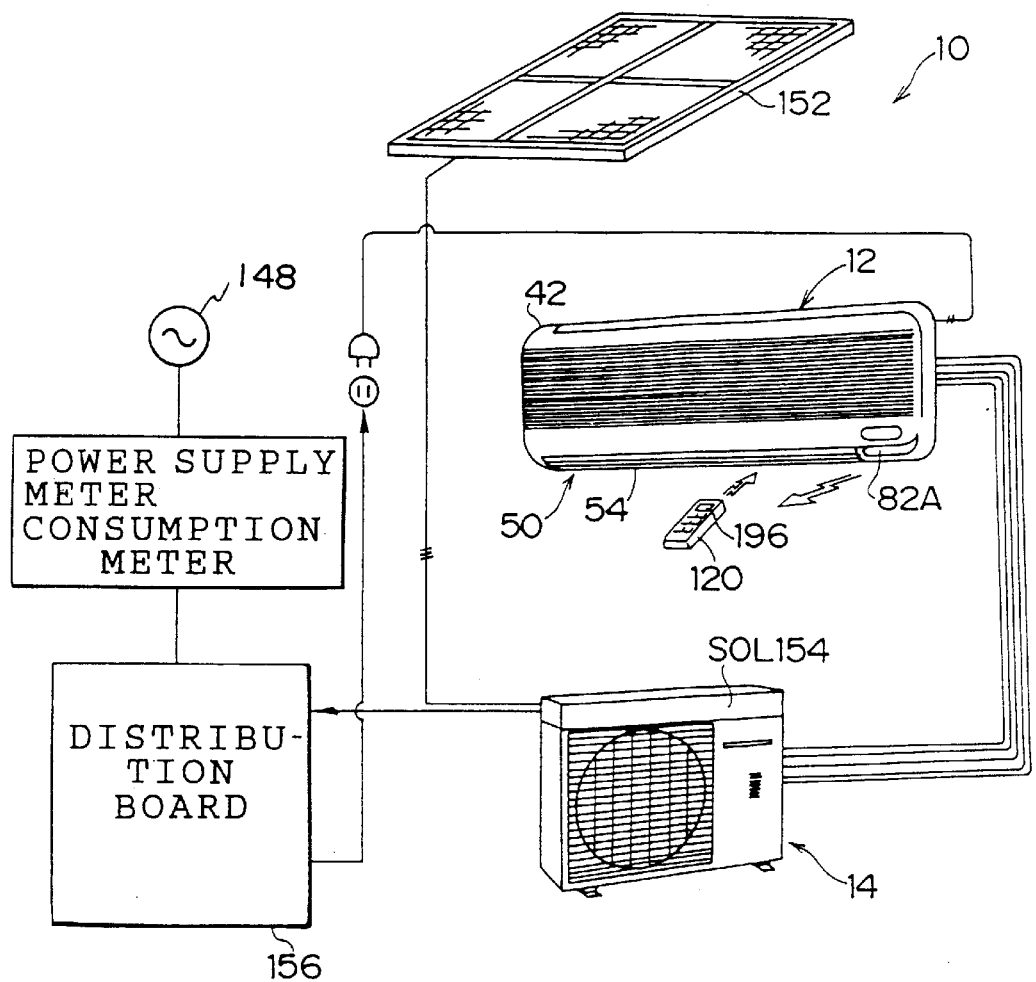
FIG. 1 is a schematic structural diagram of an air conditioner applied to an embodiment of the present invention.

FIG. 1 shows an air conditioner 10 to be applied to the embodiment of the present invention. The air conditioner 10 includes an indoor unit 12 and an outdoor unit 14. An operation signal (for example, a signal using infrared rays) transmitted from a remote control 120 is received by the indoor unit 12. Operation based on various operation modes and stopping of the air conditioner are carried out in accordance with the received operation signal.

In the air conditioner 10, a solar generator 150 serving as a system interconnection generator is provided in the outdoor unit 14. The solar generator 150 is formed by a solar-cell panel which absorbs sunlight and converts the sunlight to electrical energy, and a commercial power source supplying unit (hereinafter referred to as "SOL 154") which is provided in the outdoor unit 14 and to which electrical energy generated by the solar-cell panel 152 (hereinafter referred to as "generated power") is inputted.

The SOL 154 may be separated from the outdoor unit 14. When information of the SOL 154 is displayed on the indoor unit 12, wiring connection is necessary so that the information of the SOL 154 be superimposed, via an interface of the SOL 154, on a signal line which connects the indoor unit 12 and the outdoor unit 14.

The air conditioner 10 and the SOL 154 are separately connected to a distribution board 156. The distribution board 156 is connected to a power integrating meter 158. The power integrating meter 158 includes a power consumption meter which integrates an value of consumption of power of a commercial power source (i.e., commercial power) and a power supply meter which integrates supplied power. The air conditioner 10 is operated by commercial power supplied from the distribution board 156 and the value of power consumed by the air conditioner 10 or the like is integrated by the power consumption meter. Further, the SOL 154 effects a so-called power supply operation in which generated power is outputted, as commercial power, via the distribution board 156, and the value of power outputted is integrated by the power supply meter. Namely, even when the indoor unit 12 and the outdoor unit 14 of the air conditioner 10 are stopped, the SOL 154 can be operated.

Further, even when the SOL 154 is stopped during the night or the like, the indoor unit 12 and the outdoor unit 14 can each effect an air conditioning operation.

Meanwhile, the line of a commercial power source having, for example, a rating of single-phase three-wire 100V/200V is connected to the distribution board 156 and the SOL 154 outputs alternating current power having the same frequency as that of the commercial power source at a single-phase of 200V.

Here, the indoor unit 12 and the outdoor unit 14 of the air conditioner 10 will be described.

Figure 2:
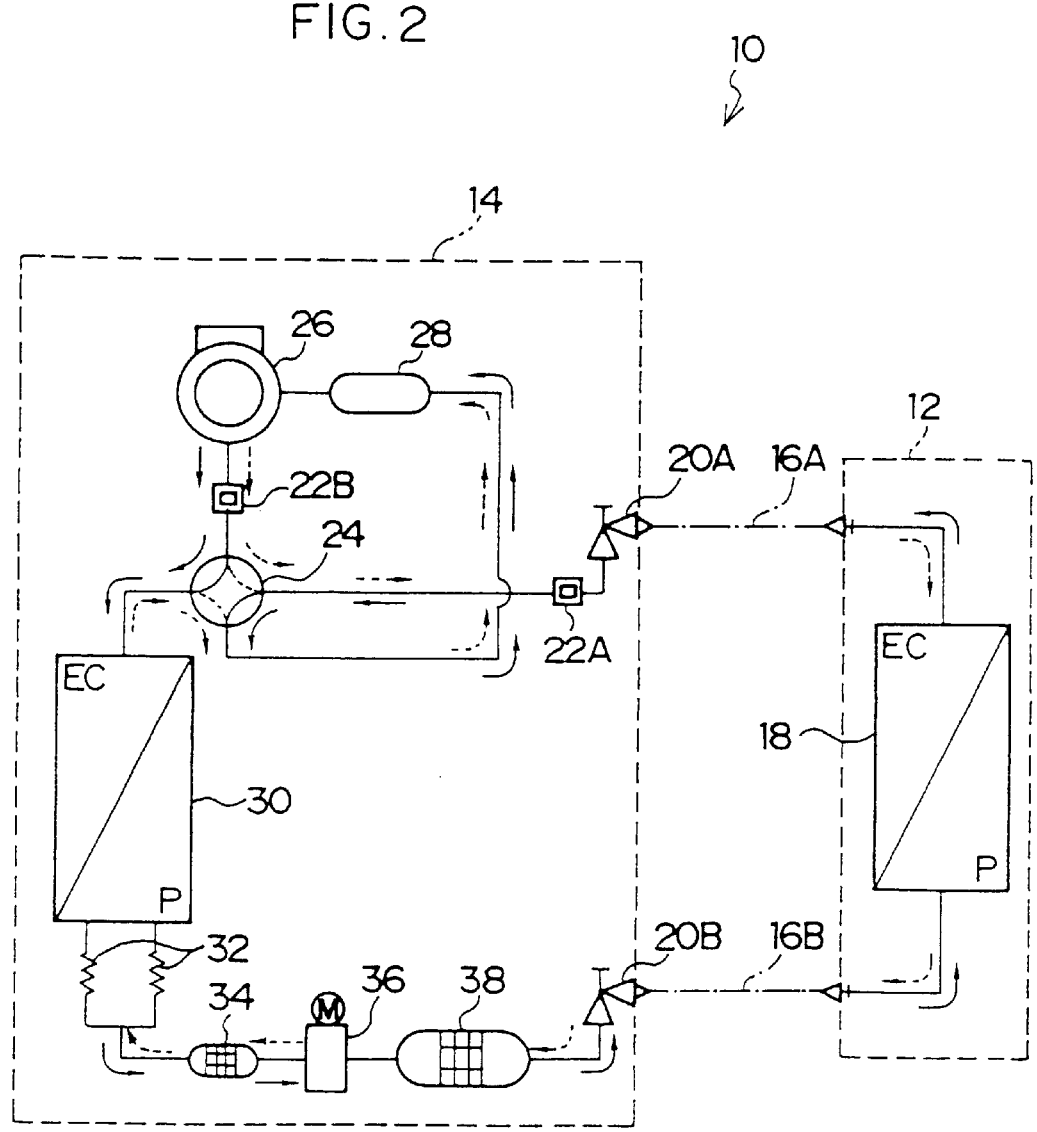
FIG. 2 is a schematic diagram which shows a refrigerating cycle provided between an indoor unit and an outdoor unit of the air conditioner.

FIG. 2 shows a refrigerating cycle provided between the indoor unit 12 and the outdoor unit 14 of the air conditioner 10. A wide refrigerant piping 16A in which gaseous refrigerant flows and a narrow refrigerant piping 16B in which liquid refrigerant flows are provided to form a pair between the indoor unit 12 and the outdoor unit 14. Respective one ends of these pipes are each connected to a heat exchanger 18 provided in the indoor unit 12.

The other end of the refrigerant piping 16A is connected to a valve 20A of the outdoor unit 14. The valve 20A is connected via a muffler 22A to a four-way valve 24. Connected to the four-way valve 24 are an accumulator 28 and a muffler 22B, which are each connected to a compressor 26. The outdoor unit 14 is provided with a heat exchanger 30. The heat exchanger 30 is connected to the four-way valve 24 at one side thereof and is also connected to a valve 20B, at the other side, via a heating/cooling capillary tube 32, a strainer 34, an electrically-operated expansion valve 36, and a modulator 38. Connected to the valve 20 B is the other end of the refrigerant piping 16B. As a result, a closed refrigerant circulation path which forms a refrigerating cycle is formed between the indoor unit 12 and the outdoor unit 14.

In the air conditioner 10, the operation mode is switched between a cooling mode (including a dry mode) and a heating mode by switching the four-way valve 24. FIG. 2 illustrates the flow of the refrigerant in each of the cooling mode (cooling operation) and the heating mode (heating operation) by using arrows.

In the indoor unit 12, a cross flow fan 44 (see FIG. 3) operates to draw in air in an interior of a room, and after allowing the air to pass through the heat exchanger 18, the cross flow fan 44 blows out the air toward the interior of a room. At this time, due to heat exchange between the air passing through the heat exchanger 18 and the refrigerant, air-conditioned air is blown out toward the interior of a room. As shown in FIG. 1, an air blowout opening 50 of the indoor unit 12 is provided with a vertical flap 54 and a horizontal flap (not shown) so as to allow air-conditioned air for the interior of a room to be blown out in a desired direction.

Figure 3:
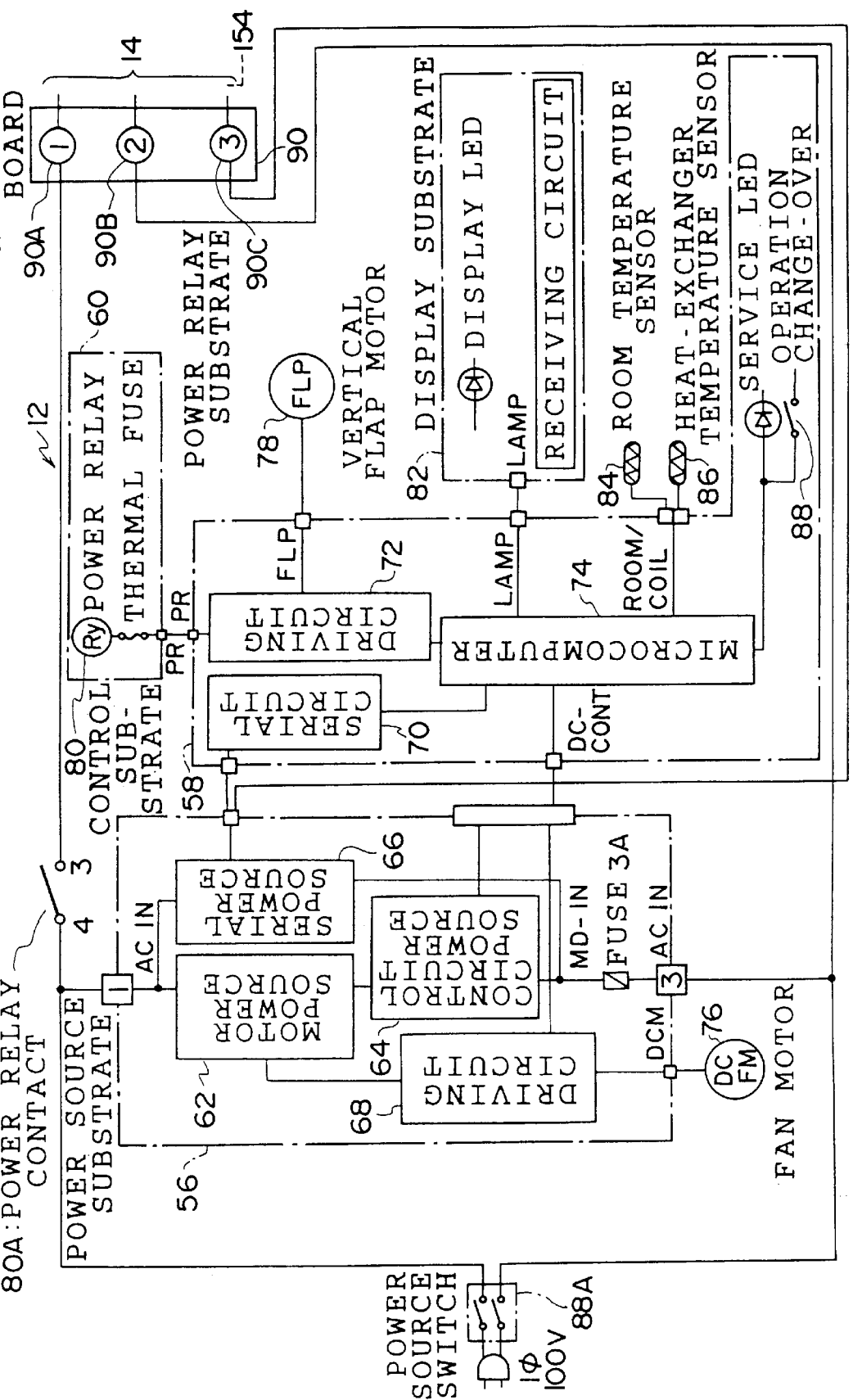
FIG. 3 is a block diagram which shows a schematic structure of the indoor unit.

As shown in FIG. 3, the indoor unit 12 is provided with a power supply substrate 56, a control substrate 58, and a power relay substrate 60, which form an air-conditioning control section. The power supply substrate 56 outputs electric power (commercial power) supplied for operating the air conditioner 10 to a motor power source 62, a control circuit power source 64, a serial power source 66, and a driving circuit 68. Further, the control substrate 58 includes a serial circuit 70, a driving circuit 72, and a microcomputer 74.

A fan motor 76 (for example, a DC brushless motor) which drives the cross flow fan 44 is connected to the driving circuit 68 of the power source substrate 56 and the motor power source 62 supplies driving power in accordance with a control signal from the microcomputer 74 provided in the control substrate 58. At this time, the microcomputer 74 controls so as to vary an output voltage from the driving circuit 68 in a range of 12V to 36V in 256 steps.

Connected to the driving circuit 72 of the control substrate 58 are a power relay substrate 60 and a vertical flap motor 78 for operating the vertical flap 54. The power relay substrate 60 is provided with a power relay 80, a thermal fuse, and the like. The power relay substrate 60 operates the power relay 80 in accordance with a signal from the microcomputer 74 and opens or closes a contact 80A at which electric power is supplied for the outdoor unit 14. When the contact 80A is closed, the air conditioner 10 is operated with electric power supplied for the outdoor unit 14.

The vertical flap motor 78 is controlled in accordance with a control signal from the microcomputer 74 to operate the vertical flap 54. Due to the vertical flap 54 swinging in the vertical direction, a blowout direction of air from the blowout opening 50 of the indoor unit 12 is changed to the vertical direction. The operation of the vertical flap 54 can be fixed so that blowout air is directed in an arbitrary direction, but in an automatic mode, the vertical flap 54 is directed in a predetermined direction in accordance with an operation mode.

By controlling rotation of the cross flow fan 44 and operation of the vertical flap 54, the indoor unit 12 of the air conditioner 10 is adjusted at desired air value and air direction, or at air value and air direction which are set to made the interior of a room comfortable, thereby allowing air-conditioned air to be blown out toward the interior of a room.

The serial circuit 70 connected to the microcomputer 74 and also connected to the serial power source 66 of the power source substrate 56 is connected to the outdoor unit 14 and the microcomputer 74 effects serial communication between the indoor unit 12 and the outdoor unit 14 via the serial circuit 70 and thereby controls the operation of the outdoor unit 14.

The indoor unit 12 is also provided with a display substrate 82 including a receiving circuit which receives an operation signal from the remote control 120 (see FIG. 1), a display LED for indicating an operation, and the like. The display substrate 82 is connected to the microcomputer 74. As shown in FIG. 1, a display portion 82 A of the display substrate 82 is provided on a front surface of a casing 42 of the indoor unit 12 and transmitting and receiving of an operation signal and the like is effected between the display portion 82A and the remote control 120. As a result, the operation signal from the remote control 120 is inputted to the microcomputer 74.

As shown in FIG. 3, a room temperature sensor 84 which detects the temperature of the interior of a room and a heat-exchanger temperature sensor 86 which detects a coil temperature of the heat exchanger 18 are connected to the microcomputer 74 of the indoor unit 12. Further, a service LED and an operation change-over switch 88, which are provided in the control substrate 58, are also connected to the microcomputer 74. The remote control 120 also includes a temperature sensor, and usually, the temperature of the interior of a room is measured by the remote control 120 and is transmitted therefrom at a predetermined timing.

The operation change-over switch 88 is used for switching between a normal operation and a test operation effected at the time of maintenance or the like, and can cut off supply of power for operating the air conditioner 10 by opening a contact of the power source switch 88A. The air conditioner 10 is used in a state in which the operation change-over switch 88 is set at a normal operating position. The service LED gives a result of self-diagnosis to a service man by being lighted at the time of maintenance.

The indoor unit 12 is connected to the outdoor unit 14 via terminals 90A, 90B, and 90C of a terminal board 90.

Figure 4:
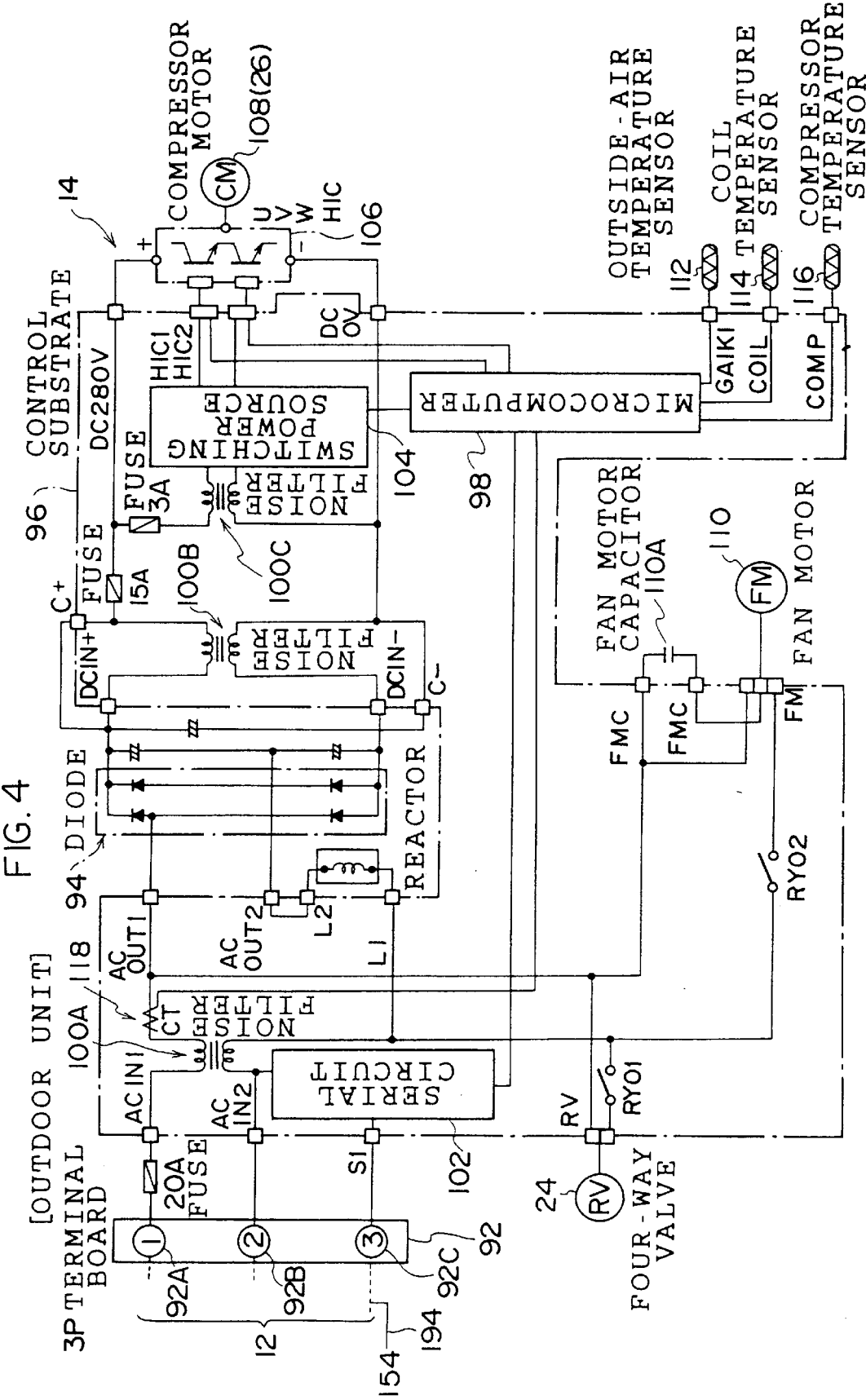
FIG. 4 is a block diagram which shows a schematic structure of the outdoor unit.

As shown in FIG. 4, the outdoor unit 14 is provided with a terminal board 92 and terminals 92A, 92B, and 92C of the terminal board 92 are connected to the terminals 90A, 90B, and 90C of the terminal board 90 in the indoor unit 12, respectively. As a result, operating power is supplied from the indoor unit 12 to the outdoor unit 14 and serial communication can be effected between the outdoor unit 14 and the indoor unit 12.

The outdoor unit 14 includes a rectifier substrate 94 and a control substrate 96. The control substrate 96 is provided with a microcomputer 98, noise filters 100A, 100B, and 100C, a serial circuit 102, a switching power source 104, and the like.

The rectifier substrate 94 rectifies electric power supplied via the noise filter 100A and smoothes the electric power via the noise filters 100B and 100C, and further outputs to the switching power source 104. The switching power source 104 is, together with the microcomputer 98, connected to an inverter circuit 106. As a result, when an induction motor is used for a compressor motor 108, electric power having a frequency corresponding to a control signal outputted from the microcomputer 98 is outputted from the inverter circuit 106 to the compressor 108 so as to drive and rotate a compressor 26.

The microcomputer 98 controls so that the frequency of electric power outputted from the inverter circuit 106 is set in an off state or in a range of 14 Hz or more (an upper limit depends on the upper limit of operating current). As a result, the number of revolution of the compressor motor 108, i.e., the compressor 26 is changed and the ability of the compressor 26 (i.e., the cooling and heating ability of the air conditioner 10) is controlled. Further, when a direct current brushless motor is used for the compressor motor 108, direct current voltage applied to a motor (the direct-current brushless motor) is varied based on a signal from the microcomputer 98 so as to control the number of revolution of the compressor motor 108.

Connected to the control substrate 96 are a four-way valve 24, a fan motor 110, and a fan motor capacitor 110A. The fan motor 110 drives a fan (not shown) for cooling the heat exchanger 30. Further, the outdoor unit 14 also includes an outside-air temperature sensor 112 which detects the temperature of outside air, a coil temperature sensor 114 which detects the temperature of a refrigerant coil of the heat exchanger 30, and a compressor temperature sensor 116 which detects the temperature of the compressor 26. These sensors are each connected to the microcomputer 98.

The microcomputer 98 switches the four-way valve 24 in accordance with the operation mode, and based on a control signal from the indoor unit 12 and detection results of the outside-air temperature sensor 112, the coil temperature sensor 114, and the compressor temperature sensor 116, the microcomputer 98 controls an on-off operation of the fan motor 110, an operating frequency of the compressor motor 108 (the compressor 26), and the like. The ability of the air conditioner 10, i.e., the ability of the compressor 26 is determined by the operating frequency of the compressor motor 108.

Figure 5:
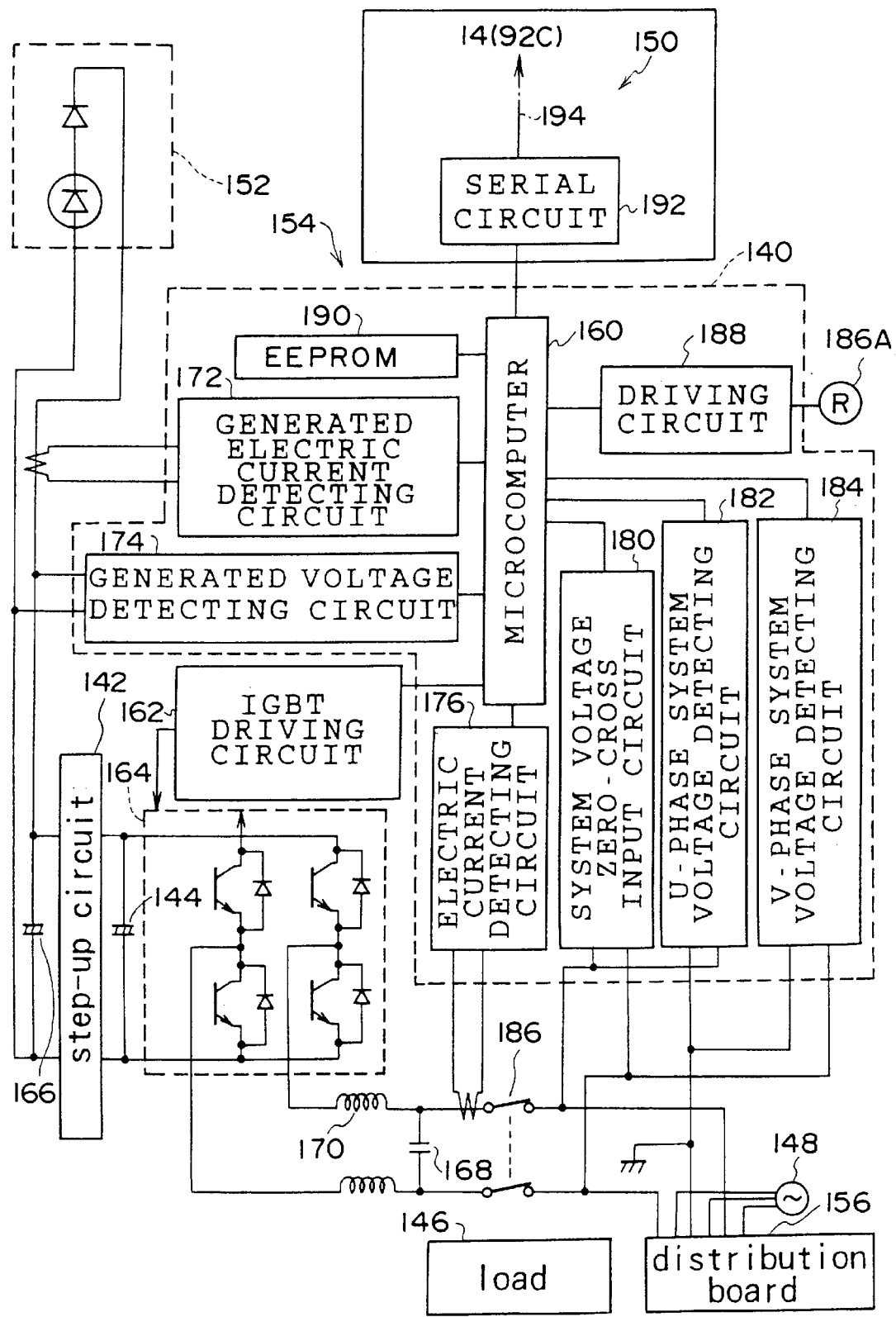
FIG. 5 is a block diagram which shows a schematic structure of a solar generator which is applied, as a system interconnection generator, to the embodiment of the present invention.

FIG. 5 shows a block diagram of the solar generator 150. A microcomputer 160 is provided in the SOL 154 of the solar generator 150. An inverter circuit 164 is connected via an IGBT driving circuit 162 to the microcomputer 160.

Electric power (direct current power) generated by a solar-cell panel 152 formed by a solar cell is supplied for the inverter circuit 164 via a capacitor 166, a step-up circuit 142, and a capacitor 144. The solar-cell panel 152 which absorbs sunlight is set in a position which is illuminated by sunlight such as the roof of a building, with a plurality of modules being set in a frame.

The inverter circuit 164 functions to convert direct current power supplied from the solar-cell panel 152 via the capacitor 166, the step-up circuit 142, and the capacitor 144 to alternating current power (output of the inverter circuit 164 is, for example, a sawtooth-shaped wave) having the same frequency as that of the commercial power (for example, 50 Hz or 60 Hz) in accordance with a switching signal controlled by the microcomputer 160 and supplied from the IGBT driving circuit 162. Meanwhile, electric power generated by the solar-cell panel 152 may be supplied for the inverter circuit 164 via the capacitor 166 without using the step-up circuit 142 and the capacitor 144.

Electric power converted to alternating current power by the inverter circuit 164 is supplied for the distribution board 156 via a choke transformer 170 and a capacitor 168 and is further supplied from the distribution board 156 to a load 146. At this time, alternating current power outputted from the inverter circuit 164 is outputted as alternating current power of the sinewave by passing through the choke transformer 170 and the capacitor 168. As a result, the load 146 connected to the distribution board 156 operates by electric power from a commercial power system 148 or electric power generated by the solar generator 150.

Connected to the microcomputer 160 are a generated electric current detecting circuit 172 comprised of a current transformer CT which detects direct current, a generated voltage detecting circuit 174 comprised of an isolation amplifier which detects a direct current voltage, a current detecting circuit 176, a zero-cross input circuit 180 of a system voltage, a U-phase voltage detecting circuit (U-phase system voltage detecting circuit) 182, and a V-phase voltage detecting circuit (V-phase system voltage detecting circuit) 184.

The microcomputer 160 detects the voltage and phase of the commercial power by the zero-cross input circuit 180 and the U-phase and V-phase voltage detecting circuits 182 and 184, and based on the results of detection, the microcomputer 160 controls the IGBT driving circuit 162 and generates a switching signal so that the phase and frequency of electric power outputted from the inverter circuit 164 coincide with those of the commercial power source.

At the same time, the microcomputer 160 calculates output power of the solar-cell panel 152 and an value of variation of power based on the output current and output voltage of the solar-cell panel 152, which are detected by the generated electric current detecting circuit 172 and the generated voltage detecting circuit 174. Based on the results of calculation, the microcomputer 160 effects the MPPT control and measures the output power.

The microcomputer 160 determines whether commercial power is stopped or not. At the time of a stoppage of power, the microcomputer 160 opens a contact of a system conductor 186 provided at the side of the distribution board 156 of the capacitor 168 so as to separate (parallel off) the inverter circuit 164 from the commercial power. At this time, the switching operation of the inverter circuit 164 is also stopped. Namely, when the microcomputer 160 detects the stoppage of commercial power, the microcomputer 160 drives a relay coil 186 A of the system conductor 186 via a driving circuit 188. Meanwhile, in order to detect the stoppage of commercial power, there can be applied an arbitrary method, for example, a method in which a third-order harmonic detecting circuit is provided, and when third-order harmonics included in the commercial power exceed a predetermined value, it is determined that the commercial power has been stopped.

The above-described microcomputer 160, generated current detecting circuit 172, generated voltage detecting circuit 174, current detecting circuit 176, zero-cross input circuit 180, U-phase voltage detecting circuit 182, V-phase voltage detecting circuit 184, and driving circuit 188 are disposed on the control substrate 140 in such a manner as to be integrated with one board.

The control circuit 140 includes an EEPROM 190 and the EEPROM 190 is connected to the microcomputer 160.

The EEPROM 190 stores data for converting direct current power to alternating current power having a frequency corresponding to the commercial power. The microcomputer 160 controls, based on the data stored in the EEPROM 190, the respective operations of various devices.

The EEPROM 190 allows electrical reading and rewriting of data. Due to control of the microcomputer 160, a low voltage is applied to the EEPROM 190 at the time of reading data and a high voltage is applied to the EEPROM 190 at the time of rewriting data.

Further, connected to the microcomputer 160 is a serial circuit 192 provided on the control substrate 140. The serial circuit 192 is connected to the terminal 92C provided in the outdoor unit 14 of the air conditioner 10 by a communication line 194 (also seen in FIG. 4, an earthing wire is not shown). Namely, the microcomputer 160 is connected to the microcomputer 74 provided in the indoor unit 12 of the air conditioner 10 via the serial circuit 192.

The microcomputer 160 outputs, via the serial circuit 192, operating data such as operation information of the solar generator 150, for example, a state in which power is generated by the solar-cell panel 152, an operating state of the SOL 154, and the like, in accordance with a request from the microcomputer 74. Further, the microcomputer 74 provided in the indoor unit 12 outputs a control signal for controlling the SOL 154 and the microcomputer 160 of the SOL 154 effects control corresponding to the control signal transmitted from the microcomputer 74.

Incidentally, the EEPROM 190 stores various parameters for precisely operating the SOL 154, in addition to data for converting direct current power to alternating current power having a frequency corresponding to the commercial power and data which indicates an operating state of the solar generator 150.

The parameters are used for detection of abnormality which occurs in at least one of respective operating states of the solar generator 150 and the air conditioner 10, which are monitored from electric power supplied from the solar-cell panel 152 and converted by the inverter circuit 164 and electric power of the commercial power source.

The parameters may include a system overvoltage value (R-phase and T-phase), a system overvoltage continued time, a system undervoltage value (R-phase and T-phase) and a system undervoltage continued time, a system overfrequency value and a system overfrequency continued time, a system underfrequency value and a system underfrequency continued time, a protective relay reset time, a voltage build-up suppression level value, an individual operation detection level value, an individual operation detection time limit, and a DC earth detecting time limit, which detect abnormality of voltage, frequency, and the like of commercial power (see FIG. 8). These numerical values are stored in a set allowable range and one numerical value which is in advance considered to be a proper one is set as a standard setting state for each item (default value). By setting these parameters in accordance with the commercial power to which the solar generator 150 is connected, power to be outputted from the solar generator 150 is properly supplied as commercial power.

Figure 6:
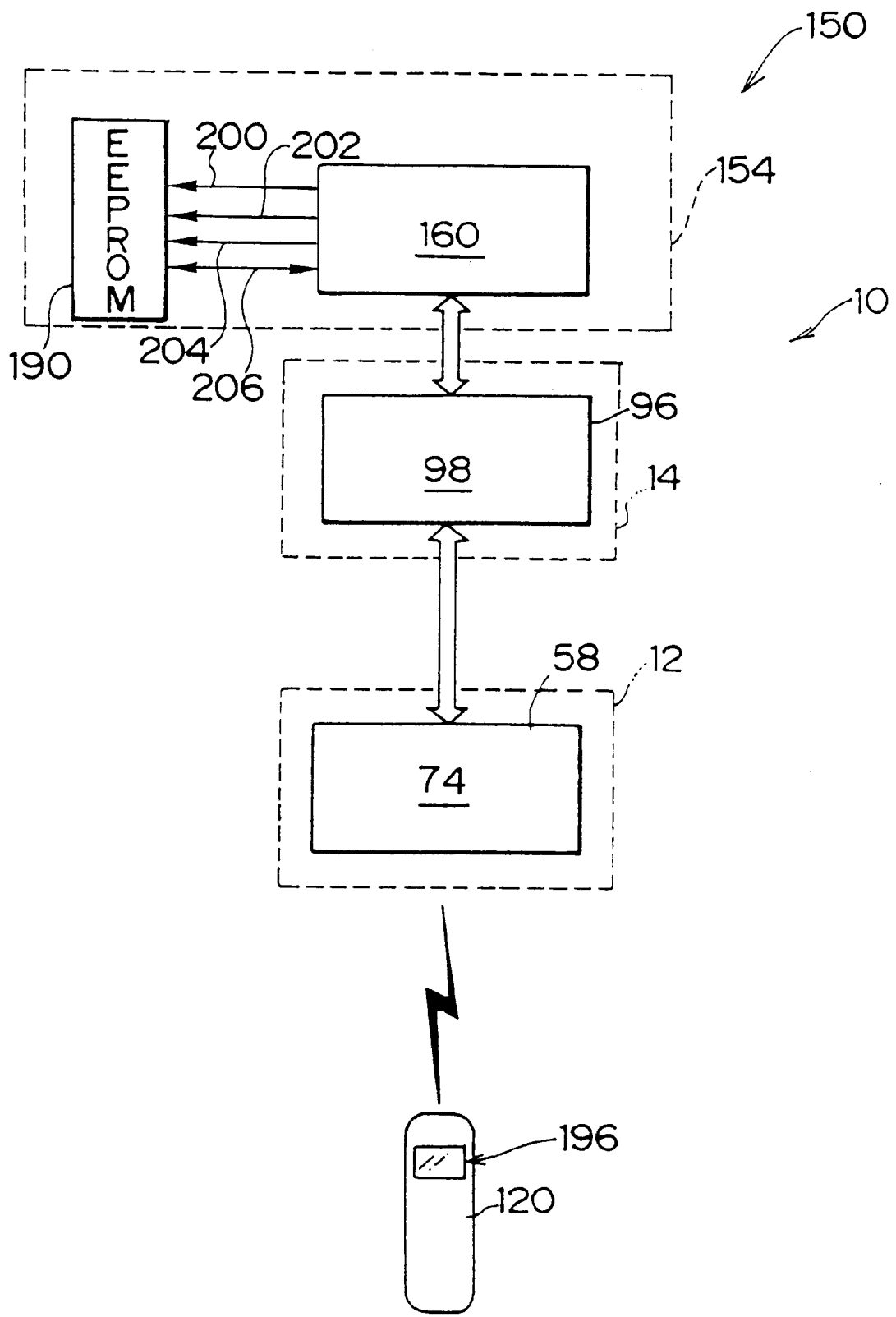
FIG. 6 is a block diagram which schematically shows an SOL related to reading and rewriting of a parameter and a flow of a signal from a remote control.

As shown in FIG. 6, the microcomputer 160 outputs, to the EEPROM 190, a writing signal 200 which indicates writing of a corrected parameter, a reading signal 202 for reading the parameter, and an address signal 204 for specifying the parameter. In accordance with input of these signals, input and output of a parameter data signal 206 is effected between the microcomputer 160 and the EEPROM 190.

In other words, at the time of reading, the microcomputer 160 outputs the address signal 204 and the reading signal 202 in accordance with a request from the microcomputer 74 provided in the indoor unit 12. As a result, the parameter stored in a corresponding position in the EEPROM 190 is outputted from the microcomputer 160 of the SOL 154.

Further, at the time of writing, the microcomputer 74 of the indoor unit 12 outputs data of the corrected parameter to the microcomputer 160 of the SOL 154 via the microcomputer 98 of the outdoor unit 14. The microcomputer 160 correspondingly outputs the address signal 204, the writing signal 200, and the parameter data signal 206. As a result, a parameter inputted from the microcomputer 74 is written at a corresponding position in the EEPROM 190 and a previously stored and set default value is corrected accordingly.

On the other hand, the remote control 120 allows display of operation information of the solar generator 150 outputted from the microcomputer 160 of the SOL 154. Meanwhile, the display of operation information may be effected by a display switching button (not shown) provided in the remote control 120 or may be provided on a special display panel which is provided separately from the display of an operating state of the air conditioner 10. Further, in addition to the remote control 120, a special remote control which indicates the operating state of the solar generator 150 may be used.

When the indoor unit 12 receives an operation signal which requires information relating to the operating state outputted from the microcomputer 160 of the SOL 154, the indoor unit 12 outputs the required operation information to the remote control 120. The remote control 120 allows display of the operation information on the display panel 196.

Further, the remote control 120 allows display of parameters in the predetermined range stored in the EEPROM 190 of the SOL 154 for each item. The remote control 120 is provided with an operating button for correcting and setting a parameter in the set allowable range. The operating button is operated so that the parameter of each item is selected and set from parameters within the set allowable range.

Alteration and setting of a parameter, which are indicated by the operation of the remote control 120, are transmitted from the remote control 120 to the indoor unit 12 in the same manner as in the air-conditioning operation and the air-conditioning stopping operation and is outputted to the microcomputer 160 of the SOL 154 via the microcomputer 74 of the indoor unit 12 (see FIG. 6).

Figure 7:
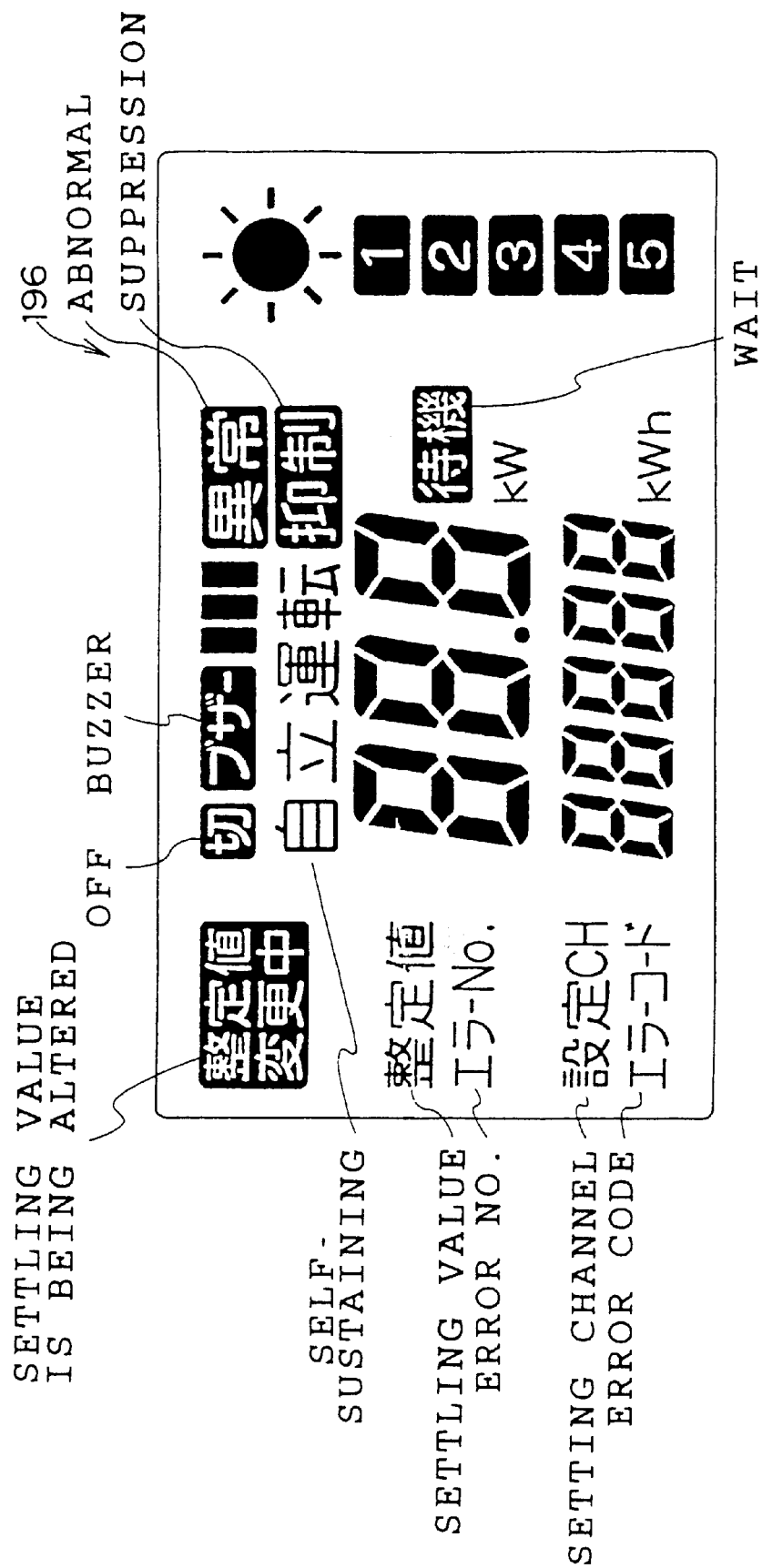
FIG. 7 is a schematic diagram which shows an example of display shown on a display panel.

FIG. 7 shows a schematic diagram of the display panel 196. The display panel 196 is provided with a display lamp and an LED of seven segments, and by controlling lighting of the display lamp and the LED, display is shown on the display panel 196. The display panel 196 displays an on/off state of the SOL 154, generated electric power, output power, and the like, and also displays the parameter stored in the EEPROM 190. Further, the display panel 196 also allows display of an error code, an error channel, and the like, at an abnormal occurrence.

The display of the display panel 196 includes an indicating mark which indicates, for example, that power generation is being executed, and also includes "generated power", "output power", and the like. Further, when power generation by the solar-cell panel 102 is stopped during the night or when generated power is not sufficiently obtained, the indicating mark which indicates that power generation is being executed is turned off and display of "wait" or the like is shown. During stoppage of a commercial power, display of "abnormal" or "suppression" is shown, and if necessary, an error code is indicated.

The EEPROM 190 also stores error data of various detecting sections such as the generated electric current detecting circuit 172 and the generated voltage detecting circuit 174, and the like. The microcomputer 160 in advance detects error data of each detecting section and stores the error data in the EEPROM 190. At the time of reading a detection value of each detecting section, the microcomputer 160 corrects the detection value of each detecting section in accordance with the error data stored in the EEPROM 190.

Next, the operation of the embodiment of the present invention will be described.

The air-conditioning operation for the interior of a room by the indoor unit 12 and the outdoor unit 14 of the air conditioner 10 is started by various setting operations of the remote control 120 including operate/stop, operation mode setting, temperature setting, air value setting, air direction setting, and the like in the state in which air-conditioning is stopped. By receiving an operation signal of a predetermined code based on the setting operation from the remote control 120, the microcomputer 74 provided in the indoor unit 12 of the air conditioner 10 carries out code analysis of the operation signal and starts control of the air-conditioning operation corresponding to the result of analysis.

Further, when the stoppage of the air-conditioning operation is indicated by the operation of operate/stop of the remote control 120, the indoor unit 12 and the outdoor unit 14 stop the air-conditioning operation.

On the other hand, when the solar-cell panel 152 of the solar generator 150 receives sunlight, the solar-cell panel 152 converts solar energy to generate direct current power corresponding to the received sunlight. The generated power is outputted to the inverter circuit 164 of the SOL 154 provided in the indoor unit 14. When the microcomputer 160 of the SOL 154 judges from detection values of the generated electric power detecting circuit 172 and the generated voltage detecting circuit 174 that a predetermined generated power is obtained, the microcomputer 160 controls the IGBT driving circuit 162 based on the generated power (the detection values of the generated electric current detecting circuit 172 and the generated voltage detecting circuit 174), detection results of the zero-cross input circuit 180, and the U-phase and V-phase voltage detecting circuits 182 and 184, and data stored in the EEPROM 190, and further outputs a predetermined switching signal corresponding to the commercial power to the inverter circuit 164.

As a result, the inverter circuit 164 drives correspondingly to the switching signal to be inputted thereto and converts direct current power to alternating current power corresponding to the frequency and voltage of the commercial power system 148, and further outputs the converted power.

Figure 9:
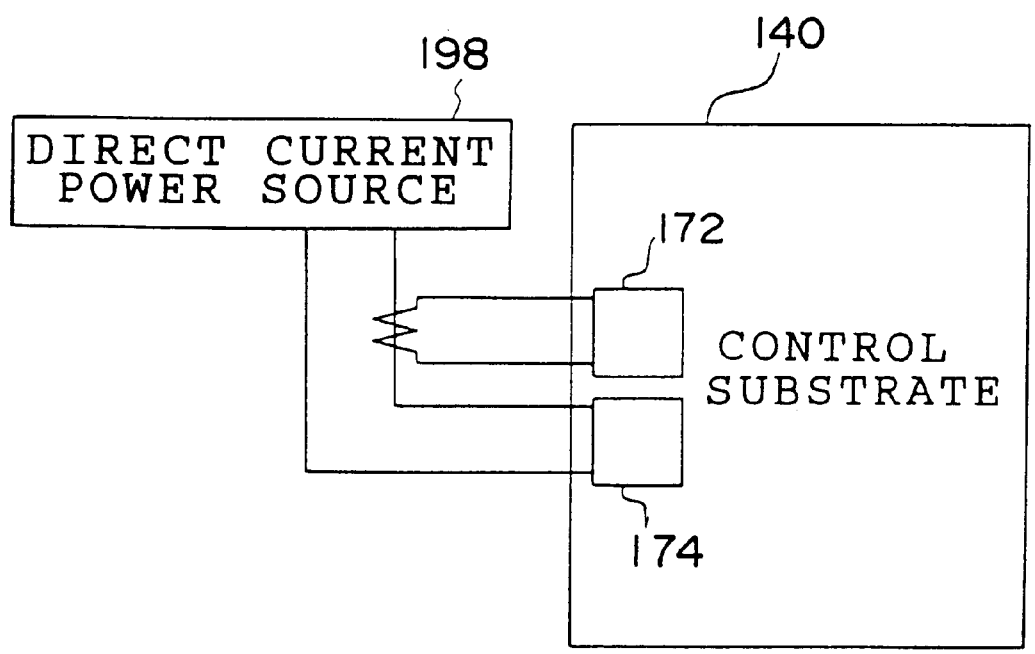
FIG. 9 is a block diagram which shows a schematic structure in which error data is extracted in the embodiment of the present invention.

First, a description will be given of the procedure for calibration of a detected voltage of an isolation amplifier which forms the generated voltage detecting circuit 174 with reference to FIGS. 9 to 11.

The calibration procedure is divided broadly into two processes: a first process in which error data of the isolation amplifier is extracted prior to the control substrate 140 being built in the solar generator 150 (SOL 154); and a second process in which a detected voltage of the isolation amplifier is actually calibrated. First, the first process will be described with reference to FIG. 10A. Meanwhile, prior to execution of the first process, as shown in FIG. 9, an output terminal of the direct current power source 198 in which the magnitude of output current can be arbitrarily set in a predetermined range is connected to each of input terminals of the generated electric current detecting circuit 172 and the generated voltage detecting circuit 174 of the control substrate 140.

Figure 10A:
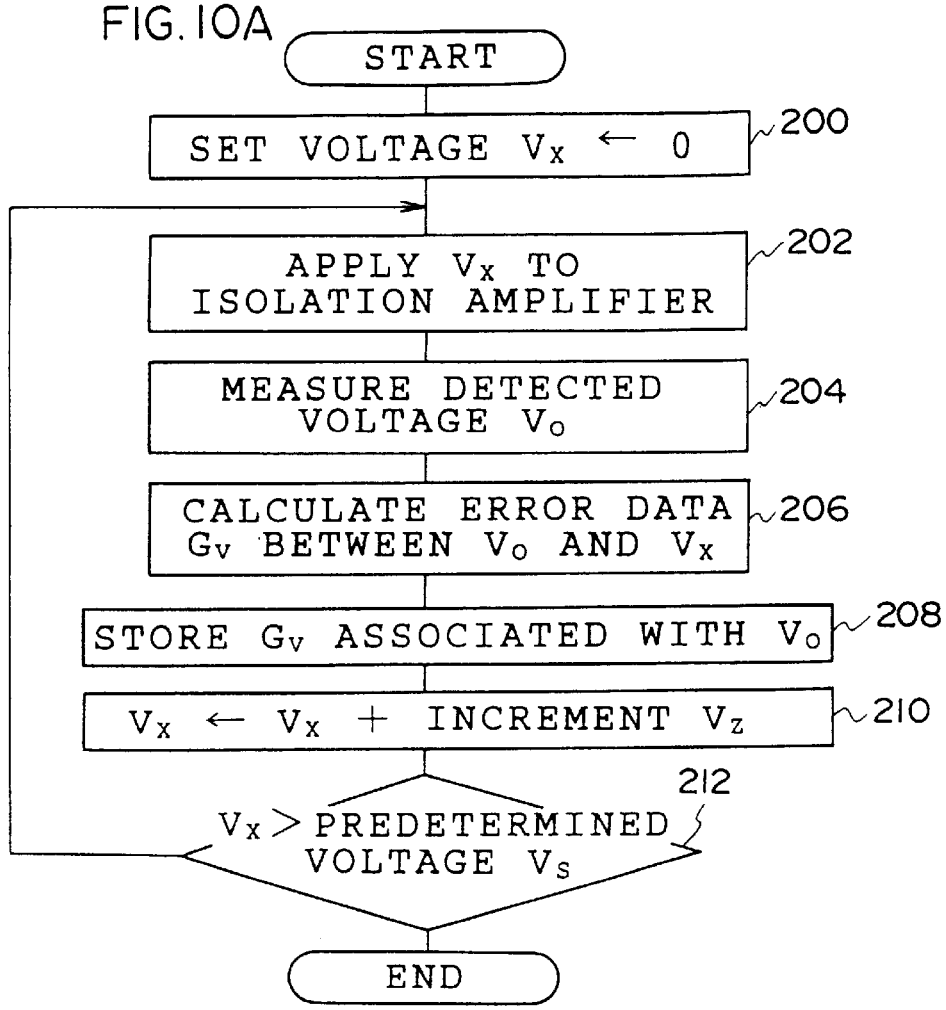
Fig. 10A is a flow chart which shows a procedure when error data of an isolation amplifier which forms a generated voltage detecting circuit 30 in the embodiment of the present invention is extracted.

In step 200 shown in FIG. 10A, a set voltage $V_x$ is set at zero as an initialization. In step 202, the magnitude of output current of the direct current power source 198 is set so that the set voltage $V_x$ is applied to the isolation amplifier. The set voltage $V_x$ corresponds to a reference value of the present invention.

In the subsequent step 204, a detected voltage $V_o$ by the isolation amplifier is measured. In step 206, error data $G_v$ of the detected voltage $V_o$ and the set voltage $V_x$ (=$V_o$-$V_x$) is calculated.

In the subsequent step 208, the error data $G_v$ is associated with the detected voltage $V_o$ and is stored at a top address of a predetermined region for storing the error data $G_v$ of the isolation amplifier in the EEPROM 190. In step 210, the value of set voltage $V_x$ is increased by a predetermined increment $V_z$ (for example, $V_z$=20).

In step 212, it is determined whether the value of set voltage $V_x$ is larger than a predetermined voltage $V_s$ (for example, $V_s$=240). When it is determined that the value of set voltage $V_x$ is not larger than the predetermined voltage $V_s$, the process returns to the above-described step 202. Subsequently, until the value of set voltage $V_x$ becomes larger than the predetermined voltage $V_s$, the process from step 202 to step 210 is executed repeatedly, and thereafter, the first process ends. During the repetition of the process from step 202 to step 210, when step 208 is executed, an address in which the error data $G_v$ is stored is increased by an value of one data for each time.

Figure 11:
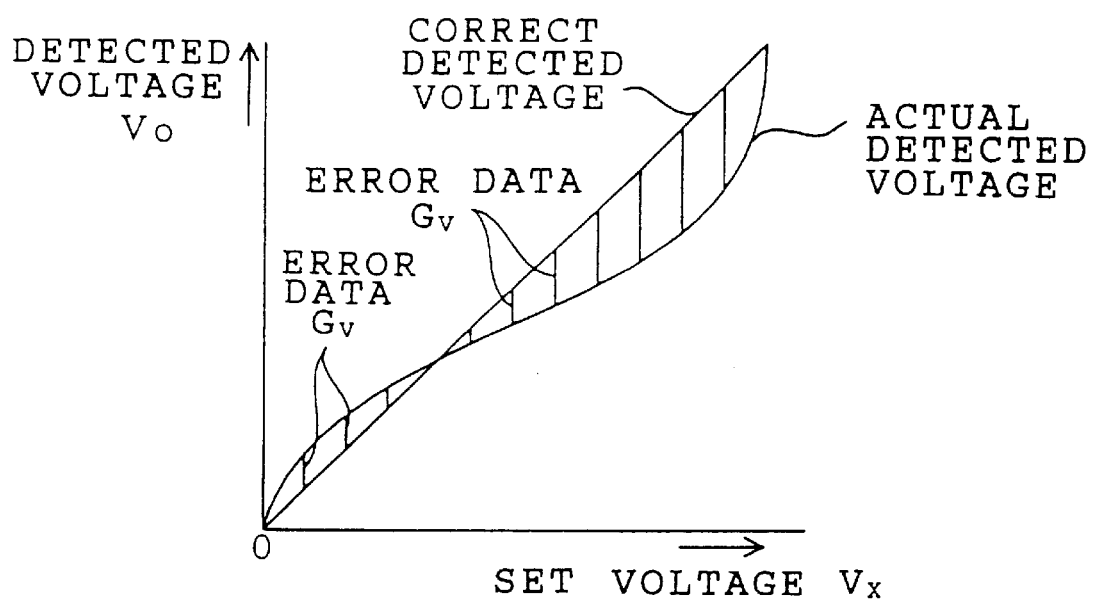
FIG. 11 is a graph which shows an example of the relation between a correct detected voltage of the isolation amplifier which forms the generated voltage detecting circuit 30, an actual detected voltage of the isolation amplifier, and error data.

As a result, detected voltage $V_o$ corresponding to each of a plurality of set voltages $V_x$ shown as an example in FIG. 11 is stored, as a table of the detected voltage $V_o$ and the error data $G_v$ as shown in Table 1, in a predetermined region of the EEPROM 190.

TABLE 1

| detected voltage $V_O$[V] | error data $G_V$[V] |
| --- | --- |
| 0 | 0 |
| 25 | 5 |
| 44 | 4 |
| . | . |
| . | . |
| . | . |
| 240 | 0 |

Figure 10B:
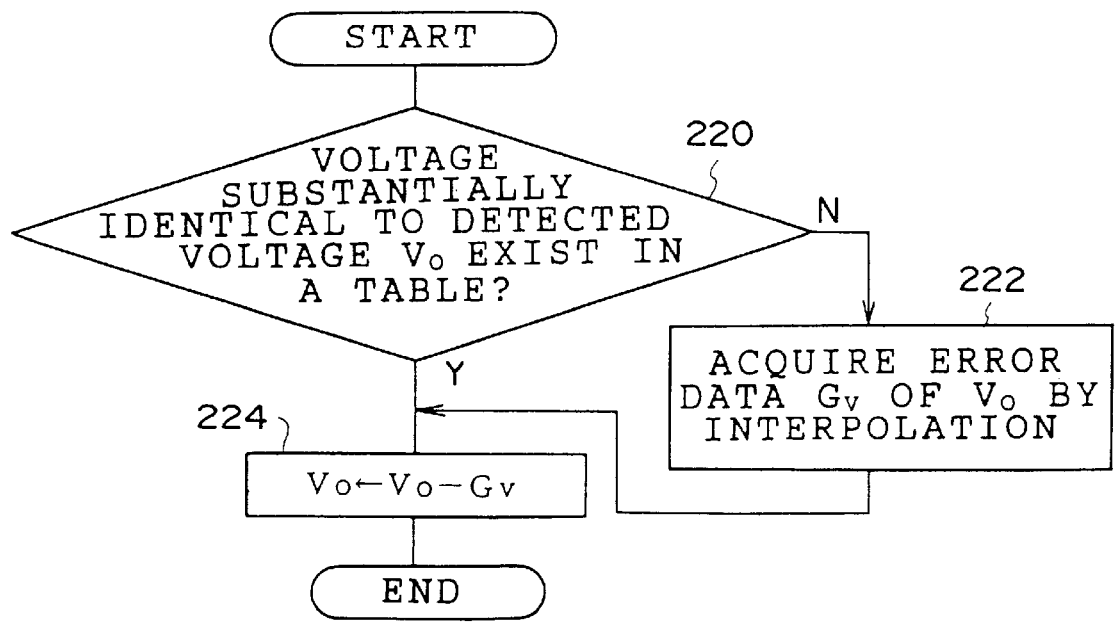
FIG. 10B is a flow chart which shows a procedure when a detected voltage of the isolation amplifier is calibrated using the extracted error data.

Next, the second process, i.e., the procedure for calibration of the detected voltage $V_o$ of the isolation amplifier when the solar generator 150 is driven will be described with reference to FIG. 10B.

First, in step 220, it is determined whether a voltage which is substantially identical to the detected voltage $V_o$ of the isolation amplifier is included in the table (see Table 1) stored in the EEPROM 190. When the voltage substantially identical to the detected voltage $V_o$ included, the error data $G_v$ corresponding to the included voltage $V_o$ is read out, as error data $G_v$ corresponding to the detected voltage $V_o$, from the EEPROM 190, and thereafter, the process proceeds to step 224.

On the other hand, when in step 220 it is determined that the voltage substantially identical to the detected voltage $V_o$ is not included in the table, the process proceeds to step 222, in which two error data $G_v$ at a lower limit value and an upper limit value of a range of voltage in which the detected voltage $V_o$ is included are read from the EEPROM 190, and error data $G_v$ corresponding to the detected voltage $V_o$ is calculated by interpolating the two error data $G_v$. Subsequently, the process proceeds to step 224.

The above-described step 222 will be herein described more specifically. For example, when the detected voltage $V_o$ of the isolation amplifier is 35 [V], two error data $G_v$ (in Table 1, 5[V] and 4[V]) at the lower limit value and the upper limit value (in Table 1, 25[V] and 44[V]) of the range of voltage with the value of 35[V] included therein are read out from the EEPROM 190, and an intermediate value of 5[V] and 4[V], i.e., 4.5[V], is calculated as error data $G_v$ corresponding to the detected voltage $V_o$ (35[V]).

In the subsequent step 224, the detected voltage $V_o$ is corrected by subtracting the error data $G_v$, thus calculated, from the detected voltage $V_o$.

The above-described steps 202 and 204 correspond to a measurement process of the present invention, steps 206 and 208 correspond to a storage process of the present invention, and steps 220 to 224 correspond to an output process of the present invention.

Next, a description will be given of the procedure for calibration of detected electric current of a current transformer CT which forms the generated electric current detecting circuit 172 with reference to FIGS. 12 and 13.

The calibration procedure is divided broadly into two processes: a first process in which error data of the current transformer CT is extracted prior to the control substrate 140 being built into the solar generator 150 (SOL 154); and a second process in which a detected electric current of the current transformer CT is actually calibrated. First, the first process will be described with reference to FIG. 12A. Meanwhile, before carrying out the first process, as shown in FIG. 9, an output terminal of the direct current power source 198 in which the magnitude of output current can be arbitrarily set in a predetermined range is connected to each of input terminals of the generated electric current detecting circuit 172 and the generated voltage detecting circuit 174 of the control substrate 140.

Figure 12A:
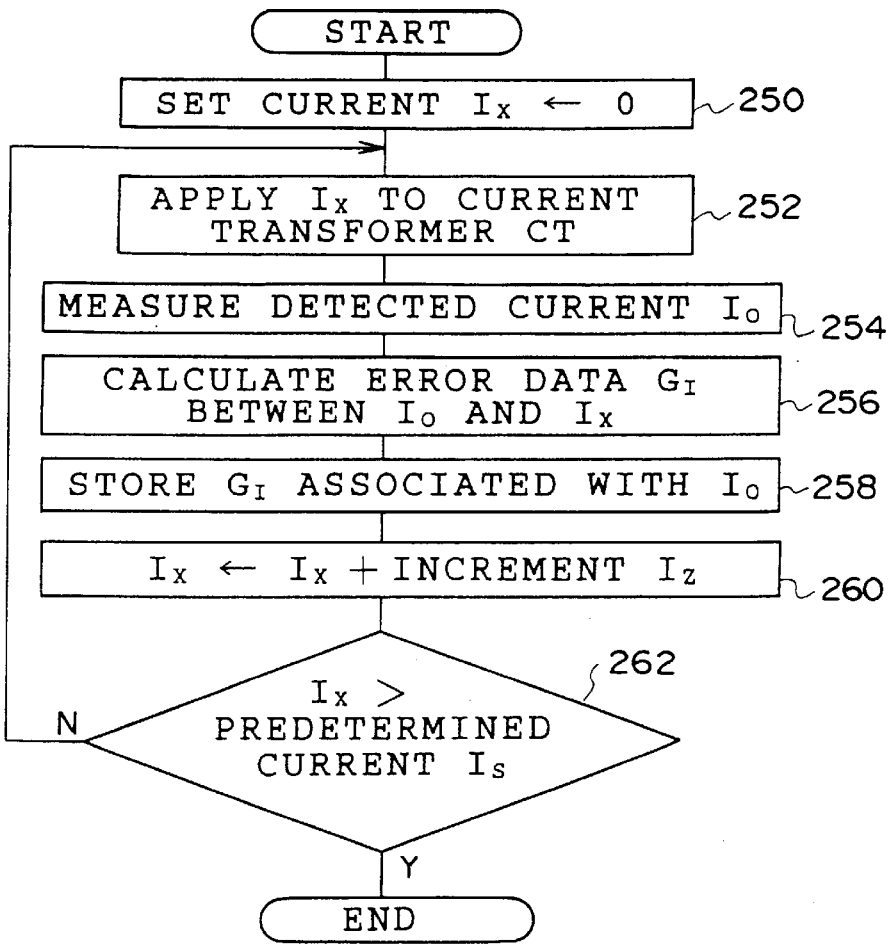
FIG. 12A is a flow chart which shows a procedure when error data of a current transformer CT which forms a generated current detecting circuit 28 in the embodiment of the present invention is extracted.
Figure 12B:
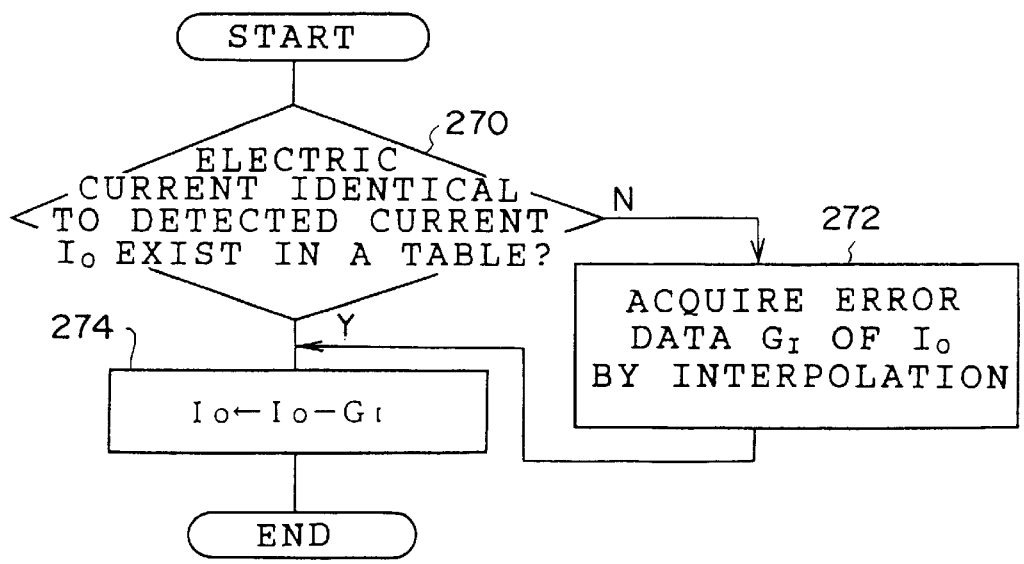
FIG. 12B is a flow chart which shows a procedure when the detected current of the current transformer CT is calibrated using the extracted error data.

In step 250 shown in FIG. 12A, a set current $I_x$ is set at zero as an initialization. In step 252, the magnitude of output current of the direct current power source 198 is set so that the set current $I_x$ is applied to the current transformer CT. The set current $I_x$ corresponds to a reference value of the present invention.

In the subsequent step 254, a detected current $I_o$ by the current transformer CT is measured. In step 256, error data $G_I$ ($=I_o-I_x$) of the detected current $I_o$ and the set current $I_x$ is calculated.

In the subsequent step 258, the error data $G_I$ is associated with the detected current $I_o$ and is stored in a top address of a predetermined region for storing the error data $G_I$ of the current transformer CT in the EEPROM 190. In step 260, the value of the set current $I_x$ is increased by a predetermined increment $I_z$ (for example, $I_z=2$).

In step 262, it is determined whether the value of the set current $I_x$ is larger than a predetermined current $I_s$ (for example, $I_s=30$). When it is determined that the value of the set current $I_x$ is not larger than the predetermined current $I_s$, the process returns to the above-described step 252. Subsequently, until the value of the set current $I_x$ becomes larger than the predetermined current $I_s$, the process from step 252 to step 260 is repeated, and thereafter, the first process ends. During the repetition of the process from step 252 to step 260, when step 258 is executed, an address in which the error data $G_I$ is stored is increased by an value of one data for each time.

Figure 13:
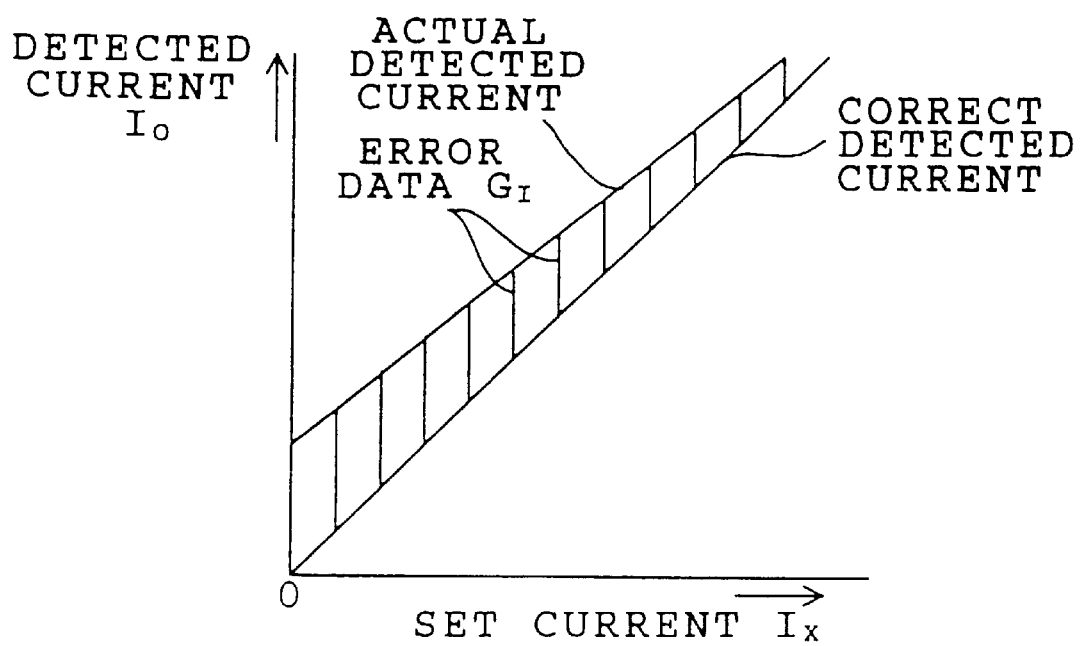
FIG. 13 is a graph which shows an example of the relation between a correct detected current of the current transformer CT which forms the generated current detecting circuit 28, an actual detected current of the current transformer CT, and error data.
Figure 14A:
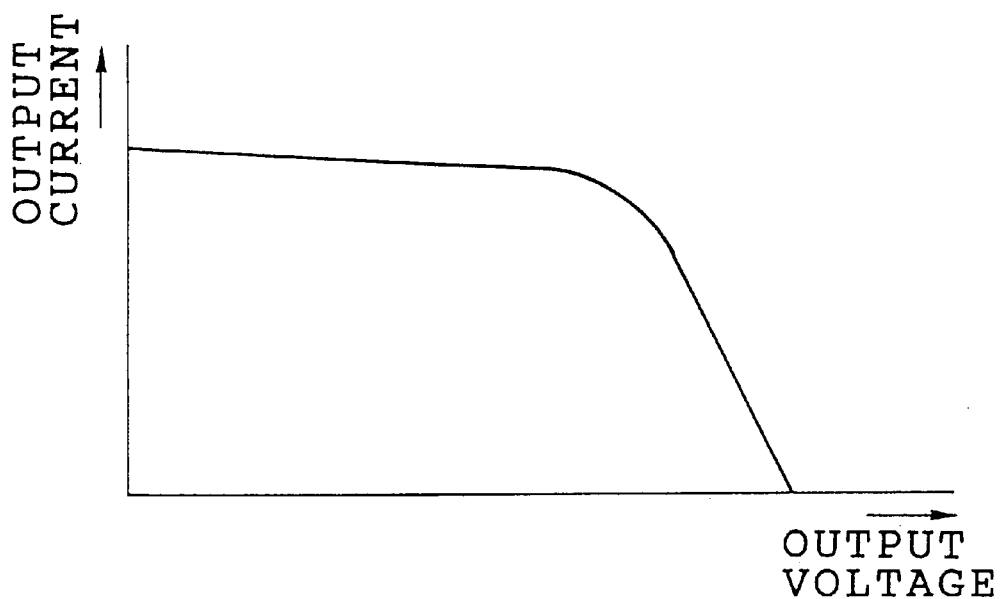
FIG. 14A is an output voltage-output current characteristic curve of a solar cell.
Figure 14B:
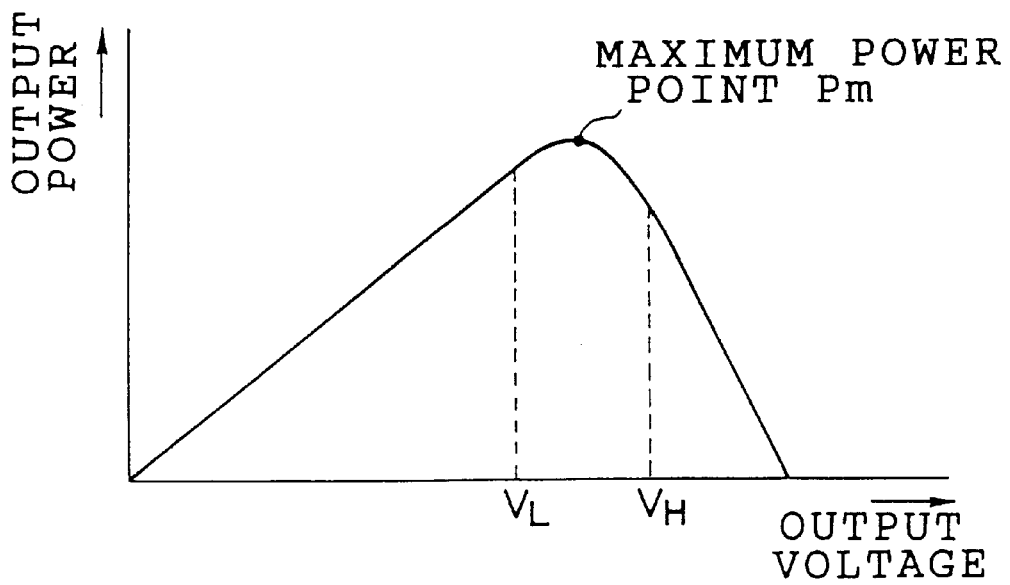
FIG. 14B is an output voltage-output power characteristic curve of a solar cell, which is used for illustration of maximum power point tracking control.

As a result, detected current $I_o$ corresponding to each of a plurality of set current $I_x$ shown as an example in FIG. 13 is stored, as a table of the detected current $I_o$ and the error data $G_I$ as shown in Table 2, in a predetermined region of the EEPROM 190.

TABLE 2

| detected current $I_O$[A] | error data $G_I$[A] |
| --- | --- |
| 5 | 5 |
| 6 | 4 |
| 7 | 3 |
| . | . |
| . | . |
| 30 | 0 |

Next, a description will be given of the second process, i.e., the procedure calibration of the detected current $I_o$ of the current transformer CT when the solar generator 150 is driven with reference to FIG. 12 B.

First, in step 270, it is determined whether an electric current which is substantially identical to the detected current $I_o$ of the current transformer CT is included in the table (see Table 2) stored in the EEPROM 190. When the decision of step 270 is yes, error data $G_I$ corresponding to the included electric current is read out, as error data $G_I$ corresponding to the detected current $I_o$, from the EEPROM 190, and thereafter, the process proceeds to step 274.

On the other hand, when in step 270 it is determined that the electric current substantially identical to the detected current $I_o$ table, the process proceeds to step 272, in which error data $G_I$ at a lower limit value and an upper limit value of a range of electric current in which the detected current $I_o$ is included are read from the EEPROM 190, and error data $G_I$ corresponding to the detected voltage $I_o$ is calculated by interpolating the two error data $G_I$. Subsequently, the process proceeds to step 274.

The above-described step 272 will be herein described more specifically. For example, when the detected current $I_o$ of the current transformer CT is 6.5[A], error data $G_I$ (in Table 2, 4[A] and 3[A]) at the lower limit value and then upper limit value (in Table 2, 6[A] and 7[A]) of the range of electric current in which the value of 6.5[A] is included are read from the EEPROM 190, and an intermediate value of 4[A] and 3[A], i.e., 3.5[A], is calculated as error data $G_I$ corresponding to the detected current $I_o$ (6.5[A]).

In the subsequent step 274, the detected current $I_o$ is corrected by subtracting the error data $G_I$, thus calculated, from the detected current $I_o$.

The above-described steps 252 and 254 correspond to a measurement process of the present invention, steps 256 and 258 correspond to a storage process of the present invention, and steps 270 to 274 correspond to an output process of the present invention.

As described above, in the method for calibrating the detecting section of the solar generator 150 according to the embodiment of the present invention, an actual measurement result of the detecting section is corrected based on the error data of measurement results of reference values of objects to be detected, which are measured and stored prior to the control substrate 140, in which the detecting section is provided, being built into the solar generator 150, and the reference values. Accordingly, high-accurate correction which reflects separate characteristics of the detecting section for the measurement results of the detecting section can be effected and power generation using sunlight can be effected at high accuracy.

In the present embodiment, there was described a case in which the present invention is applied to the calibration of the detecting section which detects output voltage and output current of the solar-cell panel 152. However, the present invention is not limited to the same, and can also be applied to all detecting elements provided in the solar generator (for example, an isolation amplifier (not shown) which detects output voltage of the step-up circuit 142, and a current transformer CT which forms the current detecting circuit 176, and also to a thermistor (not shown) which detects the temperature of a heat sink of the inverter circuit 164).

Further, in the present embodiment, there was described a case in which error data $G_v$ of detected voltage $V_o$ and the set voltage $V_x$ is in advance calculated and stored, and detected voltage $V_o$ actually detected is corrected using the error data $G_v$, but the present invention is not limited to the same. For example, there may also be applied a structure in which set voltage $V_x$ is in advance stored in association with detected voltage $V_o$ and set voltage $V_x$ corresponding to the detected voltage $V_o$ actually detected is obtained directly from a previously-stored table of detected voltage $V_o$ and set voltage $V_x$. In this case, in the present embodiment, calculation of the error data $G_v$ and calculation when the detected voltage $V_o$ is actually corrected (subtraction of the error data $G_v$ from the detected voltage $V_o$) can be omitted, and a processing time can be reduced as compared with the present embodiment. The same applies correspondingly to the case of correction of the detected current $I_o$ in the present embodiment.

Moreover, in the present embodiment, there was described a case in which error data of a plurality of points are in advance stored and error data corresponding to a detection result is obtained from the stored error data by interpolation, but the present invention is not limited to the same. For example, there may also be applied a structure in which only error data at the maximum point of the range detected by a object detecting section, and due to linear transformation based on the error data, error data corresponding to the detection result is obtained. In this case, there may be cases in which accuracy of the error data obtained by linear transformation is inferior to that of the error data obtained by the present embodiment, but the storage capacity of the EEPROM 190 for storing error data can be reduced and the operating process when error data is in advance obtained can be simplified.

In addition, in the present embodiment, there was described a case in which when error data is previously extracted, a predetermined current is applied to the isolation amplifier and the current transformer CT by using the direct current power source 198, but the present invention is not limited to the same. For example, electric current may also be applied directly to each detecting section by the microcomputer 160. In this case, all processes can be automatically effected by the microcomputer 160.

The microcomputer 160 of the SOL 154 outputs, via the serial circuit 192, generated current and generated voltage (or generated power) of the solar-cell panel 152, output current serving as commercial power, and operation information which indicates whether each section of the SOL 154 normally operates or not, successively or in accordance with a request of the microcomputer 74 of the indoor unit 12.

When the operation for change-over of display of the remote control 120, and the like is effected, a predetermined code which requires the operation information of the SOL 154 for the indoor unit 12 is transmitted from the remote control 120 to the microcomputer 74 of the indoor unit 12. When the microcomputer 74 of the indoor unit 12 receives the predetermined code, which requires the operation information of the SOL 154, from the remote control 120, the operation information inputted from the SOL 154 is transmitted to the remote control 120.

As a result, various information which indicates the operating state of the SOL 154 is shown on the display panel 196 of the remote control 120. Accordingly, an operator can easily confirm the operating state of the solar generator 150 by a signal from the SOL 154 disposed outdoors in a state of remaining in the interior of a room.

The display panel 196 of the remote control 120 indicates whether the solar-cell panel 152 is generating power or not, and when the solar-cell panel 152 is generating power, generated power is displayed. Further, power generated by the solar-cell panel 152 is sufficient (at least the minimum power outputted as commercial power), the display panel 196 displays output power and the like, and therefore, it is unnecessary to specially provide an expensive measuring device for measuring power generated by the solar-cell panel 152, output power of the SOL 154, and the like.

In the EEPROM 190 of the SOL 154, a concrete parameter (default value) which is a value of a standard setting state is in advance set for each of a plurality of items (see FIG. 8). As a result, the range in which a normal operation can be effected is defined by the set parameters of the plurality of items. The microcomputer 160 constantly compares the set parameters and corresponding values of generated power, which is supplied from the solar-cell panel 152 and converted by the inverter circuit 164, and power of a commercial power source.

When the generated power or the power of a commercial power source varies and exceeds the set parameter, and a value departing from the range in which the normal operating state can be determined is detected, it is determined that abnormality occurs in the solar generator 150 or in the air conditioner 10, and the inverter circuit 164 is paralleled off from the commercial power.

Such default value is written in the EEPROM 190 prior to forwarding the solar generator 150 from the factory. The default value varies depending on the location where the solar generator 150 is installed or the kind of the air conditioner 10 and the surroundings of the air conditioner 10 installed, and therefore, the default value is corrected by the operation using the remote control 120 corresponding to the location where the solar generator 150 is installed or the kind of the air conditioner 10 and the surroundings of the air conditioner 10 installed.

FIG. 8 shows an example of a correctable setting range of the parameter. By the operation of an operation button (not shown) of the remote control 120, the display is switched to a mode which indicates alteration of the parameter.

When an instruction for alteration of the parameter is given, an item which can be altered is read. When the item which is desired to be altered is selected and the operation button is operated, the setting allowable range is read and is displayed on the display panel 196, so that the parameter is placed in an alterable state. At this time, a desired value is set and displayed on the display panel 196 by operating the operation button and the parameter is thereby corrected. The display of an item for which the parameter is corrected and the value of the parameter is provided by lighting a 7-segment LED provided on the display panel 196 of the remote control 120, and therefore, the item of the parameter to be altered and the value of the parameter can be displayed obviously.

The corrected parameter is transmitted from the remote control 120 to the microcomputer 160 of the SOL 154 via the microcomputer 74 of the indoor unit 12 and the microcomputer 98 of the outdoor unit 14. The microcomputer 160 of the SOL 154 selects a parameter of a corresponding item from the parameters set and stored in the EEPROM 190 and corrects to the inputted parameter. At this time, a relatively high voltage is applied to a corresponding portion of the EEPROM 190 and the parameter of the corresponding item set in the EEPROM 190 is altered to the corrected value. As a result, a new parameter corresponding to the location where the solar generator 150 is installed or the type of the air conditioner and the surroundings of the air conditioner 10 installed is written, and based on the new parameter, the operating states of the solar generator 150 and the air conditioner 10 are monitored.

Further, even if supply of power for the solar generator 150 is stopped, the parameter stored in the EEPROM 190 is not deleted. When the parameter is once set, the parameter is not automatically deleted. For this reason, when power is supplied again for the solar generator 150, it is not necessary to reset the parameter, and based on the appropriate parameter, monitoring the generated power and the power of a commercial power source can be effected again.

Accordingly, since the parameter is stored in the EEPROM 190, the parameter can be set by a concrete numerical value and finely, and a previously set parameter can be easily corrected to a correct value based on the location where the solar generator 150 is installed, or the like. Further, there is no possibility that a stored content be deleted in accordance with the power source supplying state for the SOL 154, and the apparatus can be used for a long period of time.

As a result, it is possible to monitor the power generated by the solar generator 150 and the power of a commercial power source at high reliability, and if necessary, it is also possible to precisely monitor the generated power and the power of a commercial power source by writing a proper parameter.

Moreover, correction of the parameter can be simply carried out using the remote control 120 which allows transmission of data for the indoor unit 12. The remote control 120 which can display a power generating state of the solar-cell panel 152 has an additional function of altering the parameter. For this reason, correction of the parameter can be carried out without using a special switch for allowing alteration and correction of the parameter. At this time, the display panel 196 of the remote control 120 can display the setting allowable range and items of the parameter, and therefore, the parameter can be easily corrected based on the displayed setting allowable ranges and items. As a result, without moving to the location where the solar generator 150 is installed, an operator can easily correct a parameter suitable for the solar generator 150 at a position in the vicinity of the indoor unit 12.

In the present embodiment, the EEPROM 190 is used as electrically writable storage means, but other writable EPROM, for example, UV-EPROM can be used. Further, a combination with a read-only nonvolatile memory can also be applied. Moreover, a default value is in advance set in the EEPROM 190 prior to forwarding the solar generator 150 from the factory. However, when the solar generator 150 is installed, all parameters may be written by the operation of the remote control 120.

The parameter writing means is not limited to the remote control 120. For example, alteration of the parameter may be effected in such a manner that an operation panel for altering the parameter is provided in the indoor unit 12 and the indoor unit 12 is directly operated. Alternatively, by separately providing input means such as a personal computer in the indoor unit 12, alteration of the parameter may be effected by input of data from the input means.

Correction and writing of the parameter is carried out via the air conditioner 10. However, a corrected parameter may be directly written in the EEPROM 190 provided in the SOL 154 of the solar generator 150 by a remote operation.

The present embodiment was described using, as a system interconnection generator, the solar generator which outputs power generated using sunlight as commercial power, but the system interconnection generator connected to the air conditioner may have an arbitrary structure. For example, fuel cell can be used.

Further, the structure of the air condition to which the system interconnection generator is connected is not limited to that of the air conditioner 10, and any air conditioner provided with an air-conditioning control section in which a microcomputer is included at least in a unit disposed in the interior of a room (an indoor unit or the like) may be applied.

As described above, according to the method for calibrating a detecting section of the present invention, an accurate measurement result can be constantly obtained irrespective of errors of the detecting section. As a result, the system interconnection generator of the present invention allows high-accurate control based on the measurement result of the detecting section.

Further, in an air conditioner with the system interconnection generator according to the present invention, an operator can confirm an operating state of the system interconnection generator at a position apart from the system interconnection generator and can also easily carry out setting and writing of the parameter in the interior of a room in which the indoor unit is provided. Moreover, in the air conditioner with the system interconnection generator of the present invention, even if the parameter is set for each of a large number of items, concrete numerical values corresponding to the number of items can be set easily. As a result, based on proper parameters, the generated power and the power of a commercial power source can be monitored precisely.

Further, the present invention is not limited to a calibration for a sensor provided in a generator, the present invention can be apply to a calibration for a current sensor, temperature sensor or the like which are provided in an air conditioner, or for a sensor which is provided in any kind of apparatus.

What is claimed is:

1. A calibration method for a detecting means in which a physical value, measured by the detecting means incorporated into an apparatus, is calibrated, comprising the steps of:

prior to installation of the detecting means in the apparatus, storing a plurality of sets of data of differences between previously-known physical values inputted into the detecting means and measured values of the previously-known physical values outputted from the detecting means in correspondence with said measured values of the previously-known physical values; and calibrating a physical value measured by the detecting means after the detecting means is incorporated into the apparatus by adding thereto a value estimated from the differences stored in the data retrieved based on the physical value to be calibrated.

2. A calibration method of detecting means according to claim 1, wherein said detecting means is a plurality of detecting means, and said storing step stores at least one of the value of the difference or the measured value, which corresponds to the plurality of detecting means, and said calibrating step calibrates the physical value based on the value stored in said storing step for each of physical values measured by the plurality of detecting means.

3. An apparatus including means for calibrating a measured value by a detecting means incorporated into the apparatus, comprising:

storing means which stores a plurality of sets of data of differences between previously-known physical values inputted into the detecting means and measured values of the previously-known physical values outputted from the detecting means in correspondence with said measured values of the previously-known physical values prior to the detecting means being incorporated into the apparatus; and calibrating means which calibrates, based on the data stored in said storing means, a physical value measured by the detecting means after the detecting means is incorporated into the apparatus by adding thereto a value estimated from the differences stored in the data retrieved based on the physical value to be calibrated.

4. An apparatus according to claim 3, wherein the apparatus is a system interconnection generator, which allows electric power generated by a solar cell to be superimposed on a power line of a system.

5. An apparatus according to claim 4, wherein said system interconnection generator comprises an interface which allows information exchange with a apparatus having a display device, wherein an operating state of the system interconnection generator is displayed on the display device via the interface.

6. An apparatus according to claim 5, wherein the apparatus having the display device is comprised of an indoor unit and an outdoor unit so as to form a separate-type air conditioner which allows air conditioning for a room to be air-conditioned, and said interface superimposes operation information on a signal line which allows transmission and receiving of a signal between the indoor unit and the outdoor unit.

7. A calibration method for a detecting device in which a physical value, measured by the detecting device incorporated into an apparatus, is calibrated, comprising the steps of:

prior to installation of the detecting device in the apparatus, inputting a plurality of previously-known physical values into the detecting device;

outputting measured values of the previously-known physical values from the detecting device;

storing in a memory data of differences between the previously-known physical values and the measured values of the previously-known physical values in correspondence with said measured values of the previously-known physical values, wherein the number of sets of the data stored is such that non-linear approximation can be conducted between the previously-known physical values and the measured values thereof; and after installation of the detecting device in the apparatus, calibrating a physical value measured by the detecting device by adding thereto a value estimated from the differences stored in the data retrieved based on the physical value to be calibrated.

8. The calibration method according to claim 7, wherein the previously-known values are values of electric current or voltage.

9. The calibration method according to claim 8, wherein the apparatus is a solar power generation system including solar cells and a maximum power point tracking (MPPT) control system, and the detecting device is a detector for detecting electric current or voltage outputted from the solar cells to conduct MPPT control.

* * * * *